(12) United States Patent
Yoshida et al.

(10) Patent No.: US 6,324,136 B1
(45) Date of Patent: Nov. 27, 2001

(54) APPARATUS FOR AND METHOD OF SETTING ACCURATE RECORDING TIME POINT

(75) Inventors: Masayoshi Yoshida; Yoshitaka Shimoda, both of Tokorozawa (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/270,863

(22) Filed: Mar. 17, 1999

(30) Foreign Application Priority Data

Mar. 20, 1998 (JP) ................................. 10-072792

(51) Int. Cl.$^7$ ..................................................... G11B 7/00
(52) U.S. Cl. .................... 369/47.22; 369/47.27; 369/47.28
(58) Field of Search ........................... 369/47, 48, 275.3, 369/59, 47.22, 47.27, 47.28

(56) References Cited

U.S. PATENT DOCUMENTS

| Re. 33,665 | * | 8/1991 | Ogawa | 369/59 |
|---|---|---|---|---|
| 4,908,812 | * | 3/1990 | Aoshima et al. | 369/59 |
| 5,047,877 | * | 9/1991 | Herting | 369/49 |
| 5,351,231 | * | 9/1994 | King et al. | 369/48 |
| 5,416,760 | * | 5/1995 | Masood et al. | 369/47 |
| 5,446,715 | * | 8/1995 | Satomura | 369/49 |
| 5,508,985 | * | 4/1996 | Fairchild et al. | 369/48 |
| 5,563,854 | * | 10/1996 | Kobunaya et al. | 369/48 |
| 5,796,690 | * | 8/1998 | Kanno | 369/48 |
| 6,069,855 | * | 5/2000 | Fuma et al. | 369/47 |

\* cited by examiner

*Primary Examiner*—Nabil Hindi
(74) *Attorney, Agent, or Firm*—Pitney, Hardin, Kipp & Szuch LLP

(57) ABSTRACT

A recording time point setting method and apparatus are provided. The recording time point setting method is a method of setting a recording time point for recording an information piece into one of a plurality of predetermined areas on a recording medium on the basis of a plurality of marks. The marks are pre-recorded on the recording medium at predetermined intervals. The locations of the marks correspond to the locations of the predetermined areas, respectively. The locations of the predetermined areas are predetermined on the basis of a time length of the information piece. In this method, firstly, at least one of the marks is detected. Then, an expectation signal is generated on the basis of the time length of the information piece, and then, a time point at which an output of the expectation signal is started is synchronized with a time point at which the at least one of the marks is detected. The expectation signal is a signal for determining an expectation time point that one of the marks, except for the at least one of the marks already detected, is to be detected. Next, the expectation time point determined by the expectation signal is set as the recording time point.

16 Claims, 15 Drawing Sheets

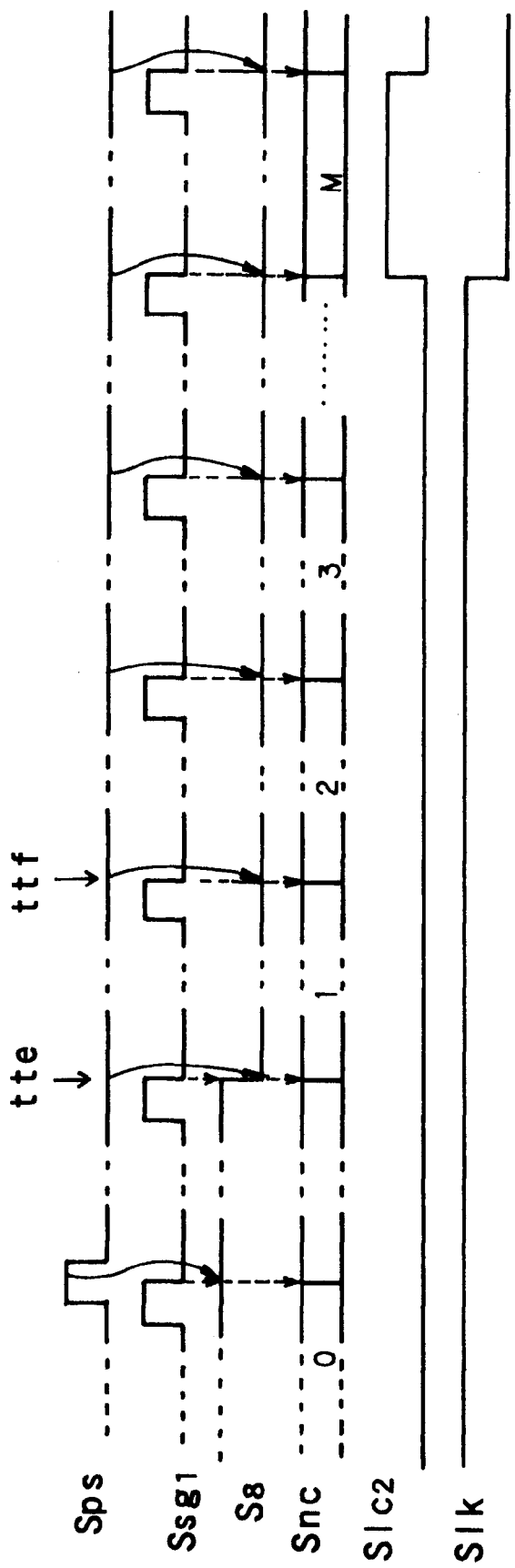

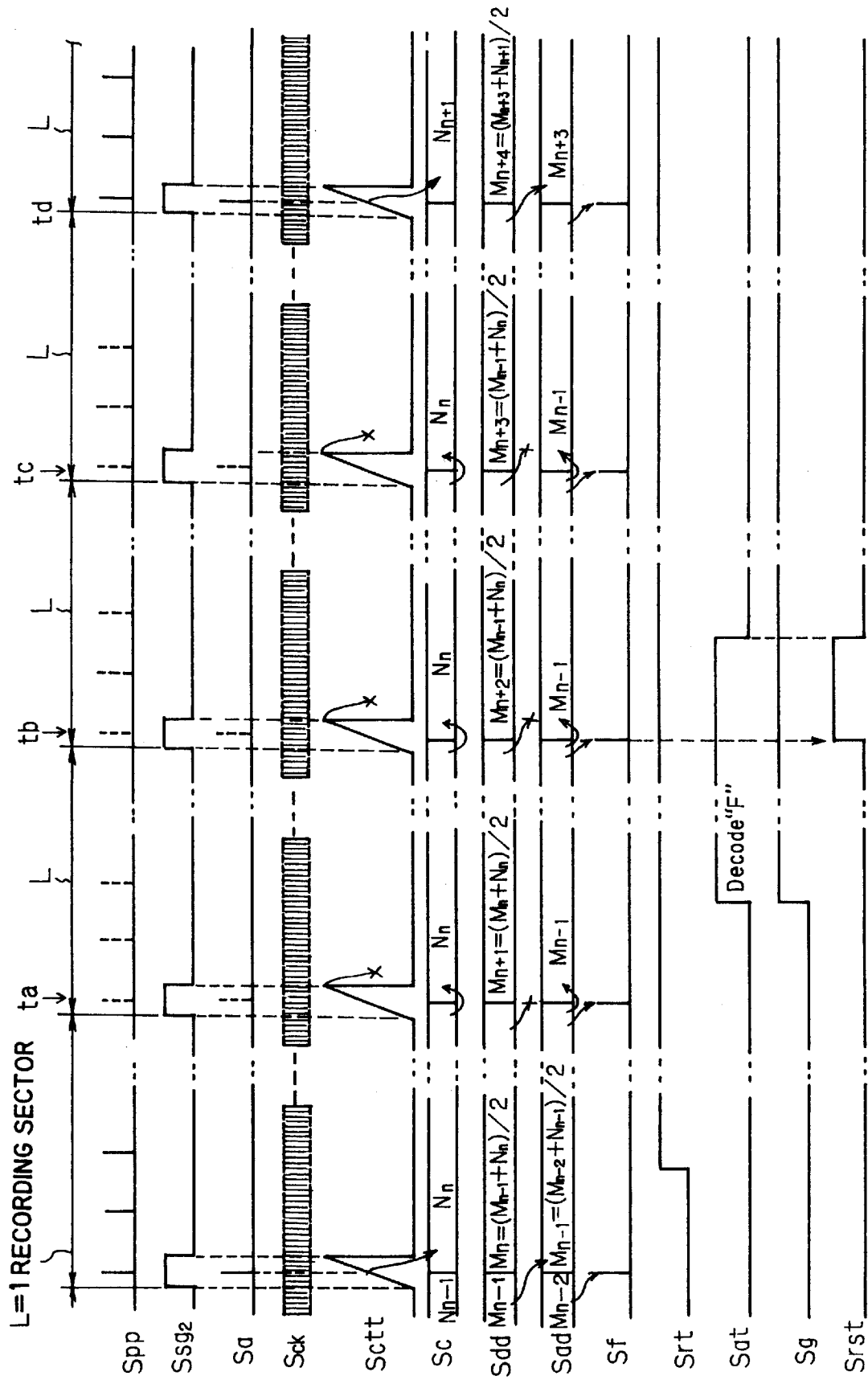

APPARATUS FOR AND METHOD OF SETTING ACCURATE RECORDING TIME POINT

BACKGROUND OF THE INVENTION

1. Field of the Invention

The present invention relates to an apparatus for and a method of setting a recording time point, which sets a recording time point (a record position) of record information on a recording medium such as an optical disk and the like.

2. Description of the Related Art

A DVD-R is a recordable optical disk and has a record density equal to about 7 times that of a CD-R (Compact Disk-Recordable). Record control information referred to as a pre-pit is recorded in advance on the recording surface of this DVD-R. When record information is recorded onto the DVD-R, an information recorder detects the position of the pre-pit, and then sets the recording time point of the record information in accordance with the position of the pre-pit.

However, if crack, contaminant or the like is present on the surface of the DVD-R, there may be a case that the pre-pit on the DVD-R can not be normally detected. This case results in a problem that the recording time point of the record information can not be normally set.

SUMMARY OF THE INVENTION

It is therefore an object of the present invention to provide an apparatus for and a method of setting a recording time point, which can set a recording time point of record information even if record control information (mark or pre-pit) recorded on an optical disk cannot be normally detected.

The present invention provides a method of setting a recording time point for recording an information piece into one of a plurality of predetermined areas on a recording medium on the basis of a plurality of marks. The marks is pre-recorded on the recording medium at predetermined intervals. The locations of the marks correspond to the locations of the predetermined areas, respectively. The locations of the predetermined areas are predetermined on the basis of a time length of the information pieces. In this method, firstly, at least one of the marks is detected. Next, an expectation signal is generated on the basis of the time length of the information piece, and then, a time point at which an output of the expectation signal is started is synchronized with a time point at which the at least one of the marks is detected. The expectation signal is a signal for determining an expectation time point that one of the marks, except for the at least one of the marks already detected, is to be detected. Next, the expectation time point determined by the expectation signal is set as the recording time point.

In this method, the locations of the marks correspond to the locations of the predetermined areas, respectively, and the locations of the predetermined areas are predetermined on the basis of the time length of the information pieces. Therefore, on the basis of the time length of the information pieces, the expectation time point can be expected. Furthermore, by synchronizing the start time point of the expectation signal with the time point that at least one mark is detected, the expectation time point can be actually determined. Once the expectation time is generated, the recording time point can be determined by using the expectation signal. Accordingly, the recording time point can be set, even if the mark (i.e., record control information) is not normally detected.

In this method, the generating process may include a process of calculating an average of the expectation time point determined by the expectation signal that is generated at a present time and the expectation time point determined by the expectation signal that is generated in the past. Therefore, the accuracy of setting the recording time point can be improved.

In the aforementioned method, the generating process may include a process of adjusting the expectation time point depending on whether no information piece is recorded on the recording medium or whether another information piece has been already recorded on the recording medium. Therefore, the recording time point can be accurately set whether no information piece is recorded on the recording medium or whether another information piece has been already recorded on the recording medium. In the case where the position at which the information piece is to be recorded is different depending on whether the recording medium is a new, unused or re-formatted recording medium or a previously used recording medium, the recording time point can be accurately set depending on this difference.

The present invention also provides an apparatus for setting a recording time point for recording an information piece into one of a plurality of predetermined areas on a recording medium on the basis of a plurality of marks. This apparatus includes: a detecting device for detecting at least one of the marks; a generating device for generating an expectation signal on the basis of the time length of the information piece and for synchronizing a time point at which an output of the expectation signal is started with a time point at which the at least one of the marks is detected by the detecting device, the expectation signal being a signal for determining an expectation time point that one of the marks, except for the at least one of the marks already detected by the detecting device, is to be detected; and a setting device for setting the expectation time point determined by the expectation signal as the recording time point.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 12B is a timing chart showing operations of the recording condition detector;

FIG. 14 is a timing chart showing operations of the reset signal generator of the timing controller.

DETAILED DESCRIPTION OF THE PREFERRED EMBODIMENTS

An embodiment of the present invention will be described below with reference to the accompanying drawings. In the description set forth hereinafter, the present invention is applied to an information recorder for recording information on a DVD-R.

I. Structure of DVD-R

Figure 1:
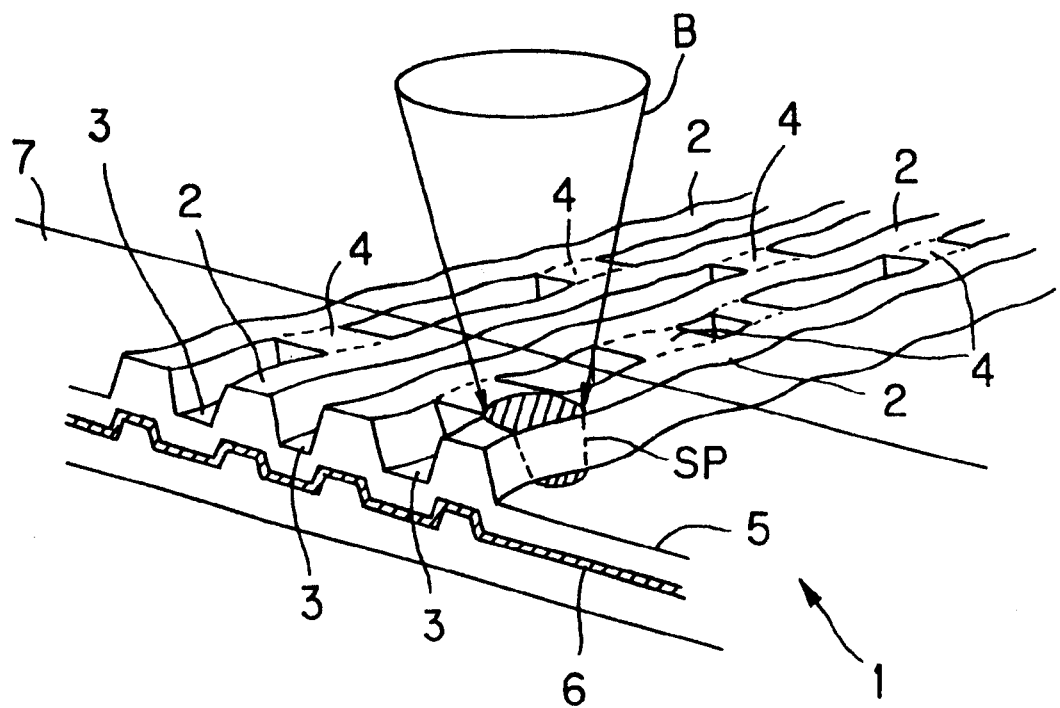
FIG. 1 is a view showing a structure of a DVD-R according to an embodiment of the present invention.

FIG. 1 shows a structure of a DVD-R 1. The DVD-R 1 is a dye type DVD-R. Information can be written to the DVD-R 1 only once. In FIG. 1, the recording surface of the DVD-R 1 is covered by a dye film 5. Groove tracks 2 and land tracks 3 are formed on the recording surface of the DVD-R 1. For example, record information representing audio information, image information and the like is recorded on the groove tracks 2. The land track 3 functions as a guide track for guiding a light beam when the record information is recorded on or reproduced from the groove tracks 2. In addition, the DVD-R 1 has a protection film 7 for protecting the recording surface and a gold evaporation film 6 for reflecting the light beam when the information is reproduced. Pre-pits corresponding to pre-information are pre-recorded on the land track 3 at predetermined intervals. The pre-pit 4 is a king of mark formed on the DVD-R 1.

When the information is recorded and reproduced, a synchronization signal to control a rotation number of the DVD-R 1 is required. This synchronization signal is recorded in advance as wobble of the groove tracks 2. The frequency of the wobble (a wobble frequency) corresponds to the rotation speed of the DVD-R 1.

When the record information is recorded on the DVD-R 1, the information recorder detects the synchronization signal based on the wobble frequency of the groove track 2, and accordingly controls the rotation speed of the DVD-R 1, in accordance with this synchronization signal. Then, the information recorder generates a clock signal based on the wobble frequency, and accordingly executes the recording operation in accordance with this clock signal. Then, the information recorder detects the pre-pit 4 to thereby determine a recording time point for recording the record information onto the DVD-R 1. The exact determination of the recording time point enables the record information to be exactly recorded at a record position (or predetermined area) to be recorded on the DVD-R 1.

Figure 2:
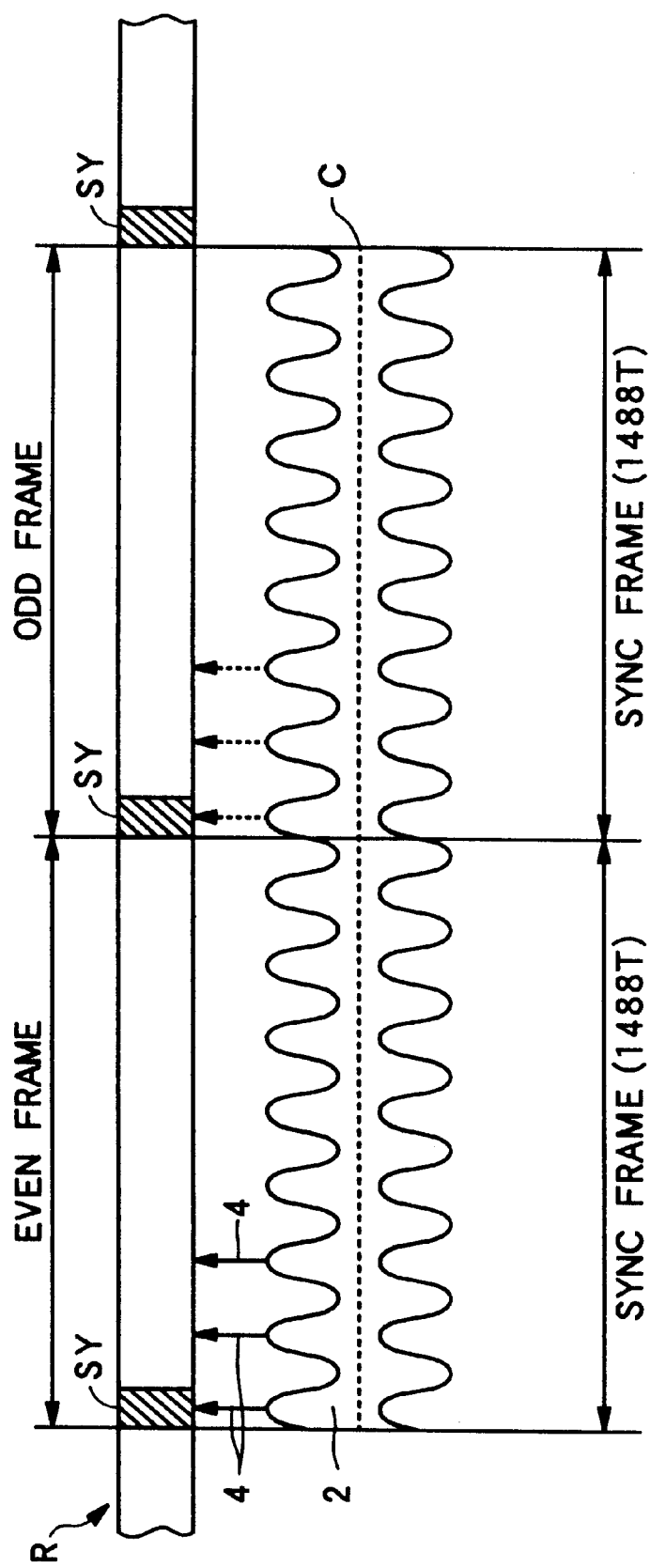
FIG. 2 is a view showing a record format of the DVD-R according to the embodiment of the present invention.

FIG. 2 shows a record format of a record information R, positions of the pre-pits 4, and the groove track 2. The record information R shown on the upper side of FIG. 2 and the groove track 2 shown on the lower side of FIG. 2 correspond to each other in position. In FIG. 2, arrow marks between the record information R and the groove track 2 show the positions of the pre-pits 4. In FIG. 2, an amplitude of the wobble of the groove track 2 is illustrated larger than the actual amplitude thereof for easy understanding.

As shown in FIG. 2, the record information R recorded on the DVD-R 1 is divided into synchronization frames. Then, a recording sector is composed of 26 synchronization frames. Moreover, an ECC block is composed of 16 recording sectors.

Also, the record information R is composed of bit rows. A time interval between the respective bits in the record information R is determined by a DVD standard and the like, as "Bit Interval T". This bit interval T is typically used as a unit to define a length of data, a length of a frame, a length of a sector and a length of a block. The length of the synchronization frame is defined in advance as a constant length, and it is, for example, 1488T. Thus, the length of the recording sector is also constant.

A synchronization information SY is recorded in the lead 14T area of the synchronization frame. A lead position of the synchronization frame or a lead position of the recording sector can be specified in accordance with the synchronization information SY.

The record information R including the synchronization information SY is recorded on the substantially central line C in the groove track 2, as a pit row. This pit row corresponds to the bit row constituting the record information R, in a one-to-one relationship. Thus, when the record information R corresponding to one recording sector is recorded on the groove track 2, a pit row having a length corresponding to that of the recording sector is formed on the groove track 2.

When the record information R is recorded on the groove track 2, it is necessary to exactly determine the record position on the groove track 2 of the record information R. In order to achieve this requirement, it is necessary to exactly set the recording time point for recording the record information R. These requirements can be achieved by the pre-pit 4 pre-recorded on the land track 3 adjacent to the groove track 2.

In principle, the pre-pit 4 is positioned on the land track 3 so as to correspond to the position at which the lead portion of the synchronization frame of the record information R is recorded. This implies that the position of the pre-pit 4 represents the record position of the lead portion of the synchronization frame.

Also, one to three pre-pits 4 are positioned closely to each other, in the position at which the lead portion of the synchronization frame is recorded. That is, a pre-pit group composed of the one to three pre-pits 4 is positioned in the position at which the lead portion of the synchronization frame is recorded. The presence or absence of the one to three pre-pits 4 represents address information representing an address of the position at which the lead portion of the synchronization frame is recorded.

Moreover, as shown in FIG. 2, the three pre-pits 4 are always positioned, closely to each other, in a position at which the lead portion of the recording sector of the record information R should be recorded. Hereafter, the position at which the lead portion of the recording sector should be recorded on the DVD-R 1 is referred to as "Sector Record Position". When the record information R is recorded, the information recorder detects the fact that the three pre-pits 4 are positioned closely to each other, and then specifies "Sector Record Position". Then, the information recorder records the lead portion of the recording sector of the record information R at "Sector Record Position".

In addition, the pre-pit 4 may be positioned only at a position at which a lead portion of an even frame is recorded. In other words, the pre-pit 4 may not be positioned at a position at which an odd frame is recorded. Alternatively, the pre-pit 4 may be formed only at the position at which the odd frame is recorded.

Moreover, an interval between the closely-positioned pre-pits 4 coincides with a period of the wobble. That is, as shown in FIG. 2, the pre-pit 4 coincides with a position at which the wobble has the maximum amplitude.

On the other hand, the wobble frequency of the groove track 2 is 140 kHz. This is constant over all the synchronization frames. In addition, 8 periods of the wobble coincides with the length of one synchronization frame.

II. Information Recorder

Figure 3:
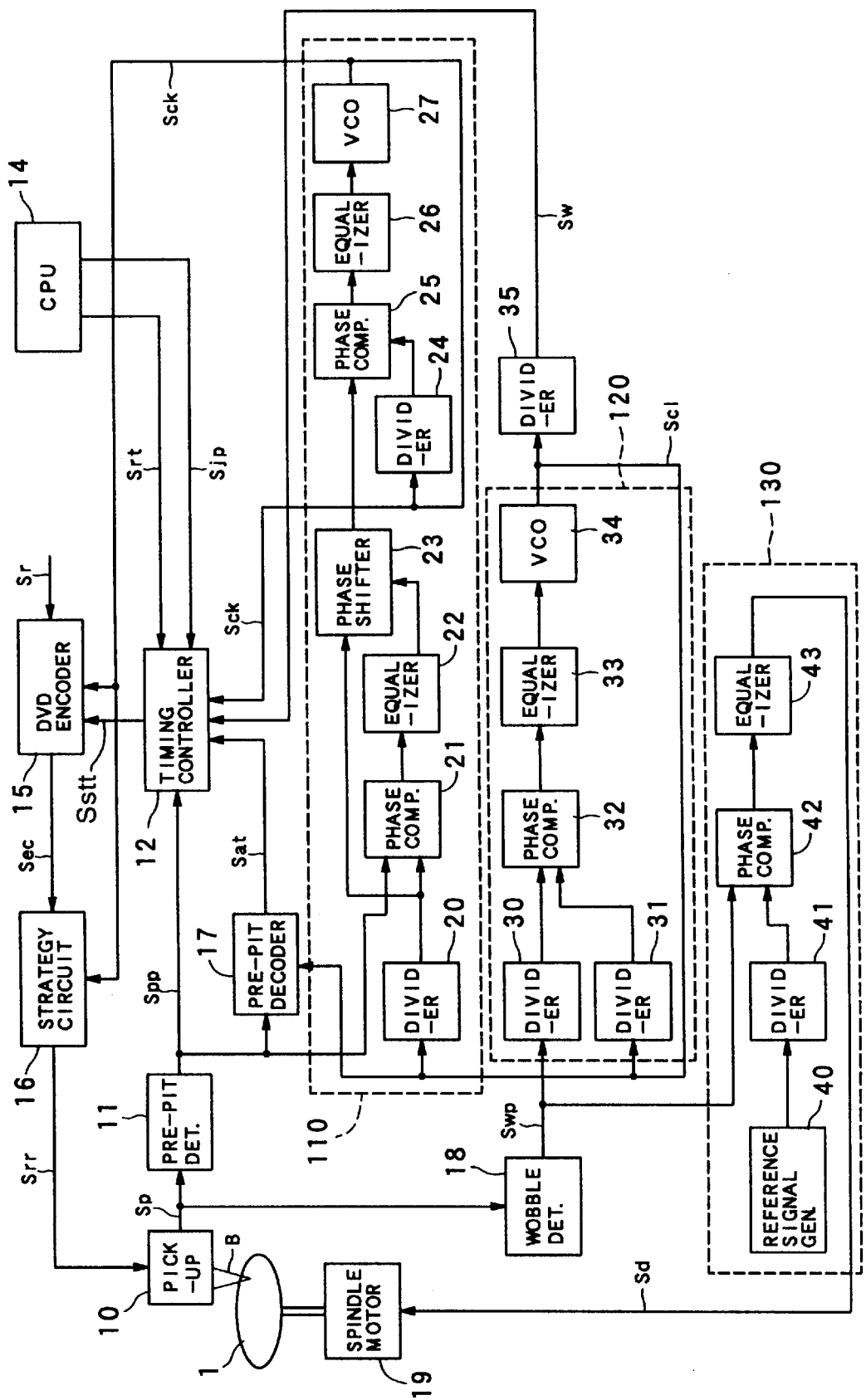
FIG. 3 is a block diagram showing an information recorder according to the embodiment of the present invention.

FIG. 3 shows the information recorder according to the embodiment of the present invention. In FIG. 3, the information recorder 100 is an apparatus for recording information on the DVD-R 1. The information recorder 100 is provided with a pickup 10, a pre-pit detector 11, a timing controller 12, a CPU 14, a DVD encoder 15, a strategy circuit 16, a pre-pit decoder 17, a wobble detector 18, a spindle motor 19, a frequency divider 35, a phase modulator 110, a wobble PLL (Phase Locked Loop) portion 120 and a spindle controller 130.

The phase modulator 110 comprises frequency dividers 20, 24, phase comparators 21, 25, equalizers 22, 26 a phase shift device 23 and a VCO (Voltage Controlled Oscillator) 27.

The wobble PLL portion 120 comprises frequency dividers 30, 31, phase comparators 32, an equalizer 33 and a VCO 34.

The spindle controller 130 comprises a reference signal generator 40, a frequency divider 41, a phase comparator 42 and an equalizer 43.

When record information is recorded on the DVD-R 1, the information recorder 100 carries out the recording operations described below. The record information to be recorded on the DVD-R 1 is input to the information recorder 100 as a record data Sr. At first, this record data Sr is received by the DVD encoder 15. Then, the DVD encoder 15 performs an 8/16 modulation on the record data Sr, in accordance with a clock signal Sck and a record start signal Sstt. The resultant signal is output to the strategy circuit 16 as a modulation signal Sec. Then, the strategy circuit 16 compensates the wave form of the modulation signal Sec, in accordance with the clock signal Sck. This compensation is done in order to adjust the shape of a pit to be formed on the DVD-R 1. The signal obtained as the result is output to the pickup 10 as a record signal Srr. The pickup 10 radiates onto the groove track 2 a light beam B modulated in accordance with the record signal Srr. Accordingly, a light spot SP is formed at the record position on the DVD-R 1, as shown in FIG. 1. The light beam is radiated such that the center of the light spot SP coincides with the middle portion of the groove track 2. As a result, a pit corresponding to the record data Sr is formed on the groove track 2. As a result, the record information is recorded on the DVD-R 1.

The information recorder 100, before actually carrying out the above-mentioned recording operations, carries out the preparation operations described below. At first, the pickup 10 radiates the light beam B to the DVD-R 1. As shown in FIG. 1, since the diameter of the light spot SP is larger than the width of the groove track 2, the light beam is also radiated to the land track 3. As a result, the light beam is radiated not only to the groove track 2 but also to the pre-pit 4 formed on the land track 3.

Then, the pickup 10 receives the light beam reflected by the DVD-R 1. At this time, the received light beam is modulated by the wobbles of the pre-pit 4 and the groove track 2, and contains information of the pre-pit 4 and the wobble. The pickup 10 generates a detection signal Sp, based on this modulated light beam. This detection signal Sp contains the information of the pre-pit 4 and the wobble. This detection signal Sp is output to the pre-pit detector 11 and the wobble detector 18.

The pre-pit detector 11 extracts the information corresponding to the pre-pit 4 from the detection signal Sp, for example, by using a radial push-pull method. The extracted information is output to the timing controller 12, the pre-pit decoder 17 and the phase comparator 21 within the phase modulator 110, as a pre-pit signal Spp.

The pre-pit decoder 17 decodes the pre-pit signal Spp based on a clock signal Scld described later, and then generates an address signal Sat representing an area to which one recording sector should be recorded, and further outputs the signal Sat to the timing controller 12.

The timing controller 12 generates the record start signal Stt representing a time when the recording operation of the record data Sr corresponding to one recording sector is started, and then outputs it to the DVD encoder 15.

The CPU 14 outputs to the timing controller 12 an instruction signal Srt instructing the start of the operation of recording the record data Sr, and a jump signal Sjp representing that the pickup 10 carried out a track jump.

The instruction signal Srt is output by the CPU 14 when a user operates an operational section (not shown) and then instructs the operation of recording the record data Sr and other operations.

The jump signal Sjp is output when the radiation position of the light beam B in the pickup 10 is moved to another track in the radial direction of the DVD-R 1, that is, when the track jump is carried out. When the track jump is carried out, the detection of the wobble frequency is transiently suspended, and also the detection of the pre-pit 4 is transiently suspended. The jump signal Sjp executes a role that these transient suspensions are reported to the timing controller 12.

On the other hand, the wobble detector 18 receives the detection signal Sp output by the pickup 10, and then extracts from this detection signal Sp the information with regard to the wobble of the groove track 2. The extracted wobble information is output to the frequency divider 30 within the wobble PLL portion 120 and the phase comparator 42 within the spindle controller 130, as a wobble detection signal Swp.

The wobble PLL portion 120 generates a clock signal Scl having a frequency synchronous with the wobble frequency of the groove track 2, in accordance with the wobble detection signal Swp, and then outputs it to the frequency divider 35 and the pre-pit decoder 17. Moreover, this clock signal Scl is also output to the frequency divider 31 for the sake of feedback.

The wobble PLL portion 120 generates the clock signal Scl as follows. At first, the frequency divider 30 divides the wobble detection signal Swp, and the frequency divider 31 divides the clock signal Scl. Then, the phase comparator 32 compares the two divided signals with each other, and then outputs the signal obtained as the result, through the equalizer 33 to the VCO 34. The VCO 34 is operated in accordance this signal, and generates the clock signal Scl.

The frequency divider 35 further divides the clock signal Scl, and then generates a wobbling signal Sw according to the wobble frequency, and further outputs it to the timing controller 12.

The phase modulator 110 uses the pre-pit signal Spp and the clock signal Scl, and then generates the clock signal Sck serving as a standard clock (or a control clock) when the record data Sr is recorded, and further outputs it to the DVD encoder 15, the strategy circuit 16 and the timing controller 12. Also, this clock signal Sck is output to the frequency divider 24 for the sake of feedback. In addition, the period of the clock signal Sck is T.

The phase modulator 110 generates the clock signal Sck as follows. At first, the frequency divider 20 divides the clock signal Scl. Then, the phase comparator 21 compares the phase of this divided signal with the phase of the pre-pit signal Spp. The signal obtained as the result is output through the equalizer 22 to the phase shift device 23. Then, the phase shift device 23 shifts the phase of the clock signal Scl divided by the frequency divider 20, in accordance with the signal sent by the equalizer 22. The phase comparator 25 compares this shifted signal with the clock signal Sck divided by the frequency divider 24.

The signal obtained as the result is sent through the equalizer 26 to the VCO 27. The VCO 27 is driven in accordance with this signal, and generates the clock signal Sck.

The spindle controller 130 generates a drive signal Sd for controlling the rotation number of the spindle motor 19 based on the wobble detection signal Swp output by the wobble detector 18, and then outputs it to the spindle motor 19.

The spindle controller 130 generates the drive signal Sd as follows. At first, the frequency divider 41 divides a reference signal output by the reference signal generator 40. Then, the phase comparator 42 compares the phase of a signal output by the frequency divider 41 with the phase of the wobble detection signal Swp. The equalizer 43 compensates the frequency of the signal obtained as the result.

In the information recorder 100, such a preparation operation may be carried out not only when the actuation of the information recorder 100 is started, but also when the track jump of the pickup 10 is done. This is because the track jump of the pickup 10 causes the detection of the wobble to be transiently suspended and thereby the synchronization between the reference signal, the clock signal Scl and the clock signal Sck is destroyed. Hereafter, a situation that the track jump of the pickup 10 causes the synchronization to be destroyed is referred to as "Non-Establishment State". Also, a situation that the synchronization is normally established is referred to as "Establishment State".

III. Timing Controller

Figure 4:
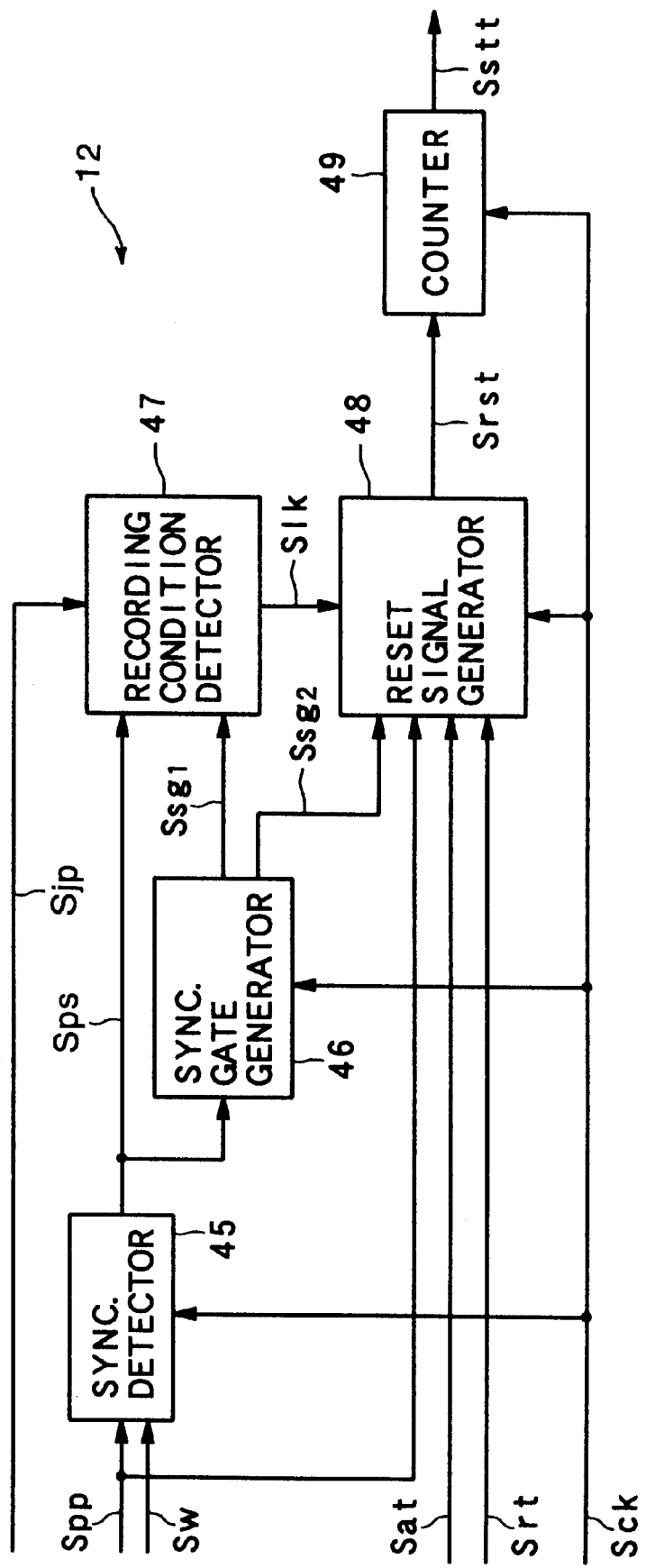
FIG. 4 is a block diagram showing a timing controller of the information recorder.

FIG. 4 shows a configuration of the timing controller 12. As mentioned above, the timing controller 12 is the device for generating the record start signal Sstt representing the timing when the operation of recording the record data Sr corresponding to one recording sector is started.

As shown in FIG. 2, it is necessary to exactly determine the record position of the record data Sr (the record information R) corresponding to the recording sector, in accordance with the relation to the position of the pre-pit 4 formed on the DVD-R 1. Actually, the operation of recording the record data Sr corresponding to the recording sector must be started from "Sector Record Position". The timing controller 12 performs the role of exactly determining the recording time point that the operation of recording the record data Sr is started, in order to achieve such a precisely recording operation.

As shown in FIG. 4, the timing controller 12 comprises a synchronization detector 45, a synchronization gate generator 46, a recording condition detector 47, a reset signal generator 48 and a counter 49.

Figure 5:
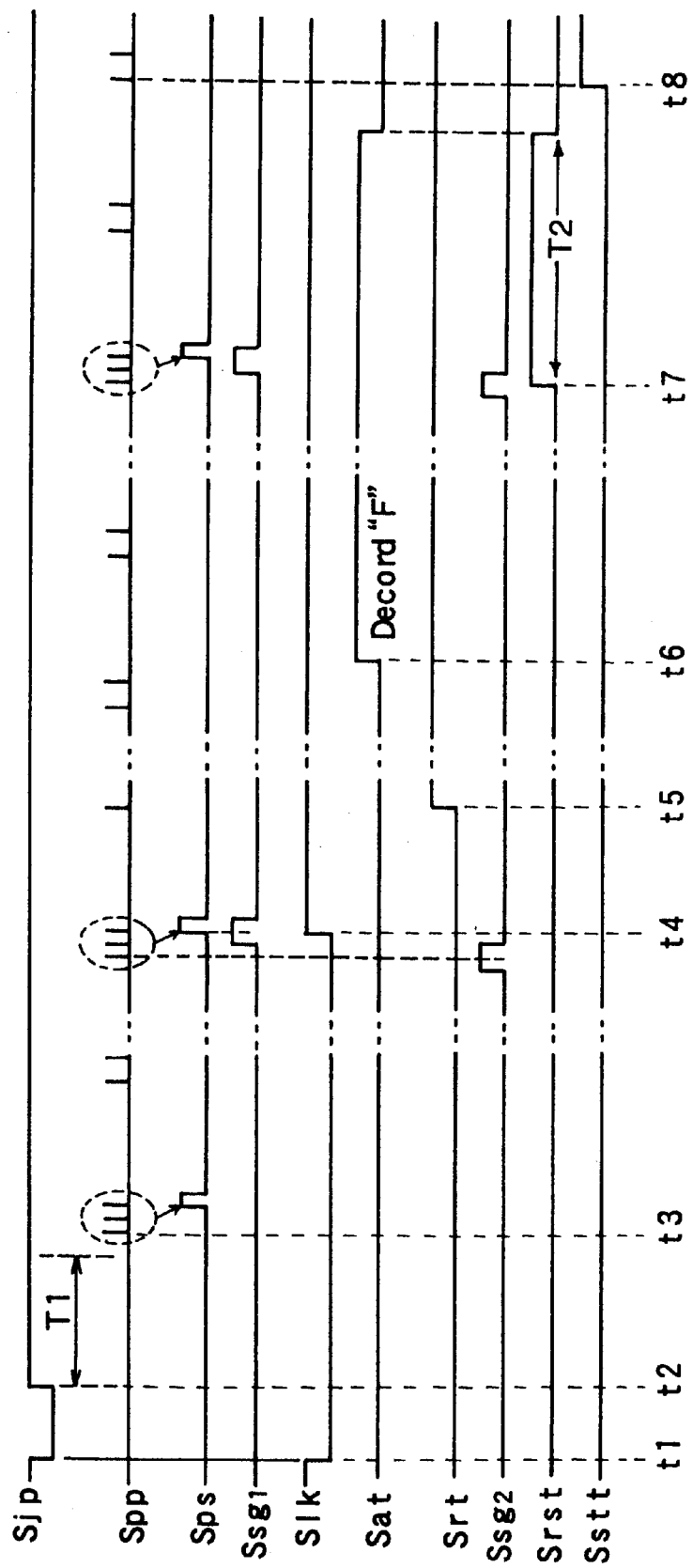
FIG. 5 is a timing chart showing operations of the timing controller.

The timing controller 12 is operated as follows. A jump signal Sjp sent from the CPU 14 to the timing controller 12 is LOW while the pickup 10 carries out the track jump, and is HIGH while it does not carry out the track jump. In FIG. 5, If the track jump of the pickup 10 is started at time t1 and the track jump is ended at time t2, the jump signal Sjp is switched from the LOW state to the HIGH state at time t2.

After an elapse of a predetermined time T1 from time t2, the normal detection of the pre-pit 4 is started at time t3. As a result of this detection, the pre-pit signal Spp is input to the synchronization detector 45. As shown in FIG. 5, the pre-pit signal Spp is a pulse signal representing the arrangement of the pre-pit 4 as it is. In FIG. 5, a section in which three pulses continuously appear in the short time indicates "Sector Record Position".

Then, the synchronization detector 45 generates a detection synchronization signal Sps representing an actual "Sector Record Position", in accordance with the pre-pit signal Spp. As shown in FIG. 5, the detection signal Sps is a signal in which a short pulse appears at a position corresponding to "Sector Record Position". This detection synchronization signal Sps is output to the synchronization gate generator 46 and the recording condition detector 47.

The synchronization gate generator 46 generates, in accordance with the detection synchronization signal Sps and the clock signal Sck, a synchronization gate signal Sag1 used for the detection of "Establishment State", and a synchronization gate signal Ssg2 used for expecting and setting a basis of a recording time point of the record data Sr.

The synchronization gate signal Ssg1 is generated on the basis of a previously-detected detection synchronization signal Sps, in such a way that the rising time of a normally-generated detection synchronization signal Sps is located at the substantially middle point in a period while the synchronization gate signal Sag1 is HIGH, as shown in FIG. 5.

The synchronization gate signal Ssg2 is generated on the basis of the previously-detected detection synchronization signal Sps, in such a way that a timing when a lead pulse is detected among three pulses continuously appearing at a timing at which the lead portion of the recording sector is recorded is located at the substantially middle point in a period while the synchronization gate signal Ssg2 is HIGH.

Then, the synchronization gate signal Sag1 is output to the recording condition detector 47, and the synchronization gate signal Ssg2 is output to the reset signal generator 48.

Then, the recording condition detector 47 determines whether or not a temporal position of the detection synchronization signal Sps coincides with that of the synchronization gate signal Sag1 as shown in FIG. 5. Moreover, the recording condition detector 47 determines whether or not the situation that both the pulse signals coincide with each other continues a predetermined time (for example, approximately two times). Accordingly, the recording condition detector 47 determines whether a present state of the information recorder 100 is in "Establishment State" or "Non-Establishment State". If the state of the information recorder 100 is in "Establishment State", the recording condition detector 47 outputs a state signal Slk that is HIGH. On the other hand, if the state of the information recorder 100 is in "Non-Establishment State", the recording condition detector 47 outputs a state signal Slk that is LOW. This state signal Slk is sent to the reset signal generator 48. Accordingly, the reset signal generator 48 can know whether the present state of the information recorder 100 is in "Establishment State" or "Non-Establishment State". In FIG. 5, "Establishment State" is established at time t4.

The reset signal generator 48 uses the synchronization gate signal Ssg2, the pre-pit signal Spp, the state signal Slk, the address signal Sat, the clock signal Sck and the instruction signal Srt, and then generates a reset signal Srst. The reset signal Srst is a signal for indicating the time point which is basis for the recording time point for exactly recording the lead portion of the recording sector at "Sector Record Position" on the DVD-R 1.

The reset signal generator 48 generates the reset signal Srst if the normal detection of the pre-pit 4 is done and further the detection synchronization signal Sps is normally generated. This operation is a basic operation of the reset signal generator 48. In addition to this basic operation, the reset signal generator 48 according to the embodiment of the present invention can generate the normal reset signal Srst by using the synchronization gate signal Ssg2, even if the detection of the pre-pit 4 is not transiently done and thereby the generation of the detection synchronization signal Sps is transiently stopped. In other words, the reset signal generator 48 can expect the recording time point of the record data Sr.

Then, the counter 49 delays the reset signal Srst by a predetermined amount in order to determine the final time point for the recording the record data Sr, and then generates the record start signal Sstt, and further outputs it to the DVD encoder 15. In FIG. 5, a counting operation by the counter 49 is done between times t7 and t8 (T2). The record start signal Sstt is output at the time t8. The record start signal Sstt is a signal for setting the final recording time point of the record data Sr, in order to exactly record the lead portion of the recording sector at "Sector Record Position" of the DVD-R 1.

In addition, the delayed amount of the reset signal Srst delayed by the counter 49 is different, for example, depending on a fact that a presently recording operation is a recording operation of adding a new record data Sr to the DVD-R 1 on which information was already recorded or a recording operation of firstly recording information on the DVD-R 1 on which information is not recorded.

IV. Synchronization Detector

Figure 6:
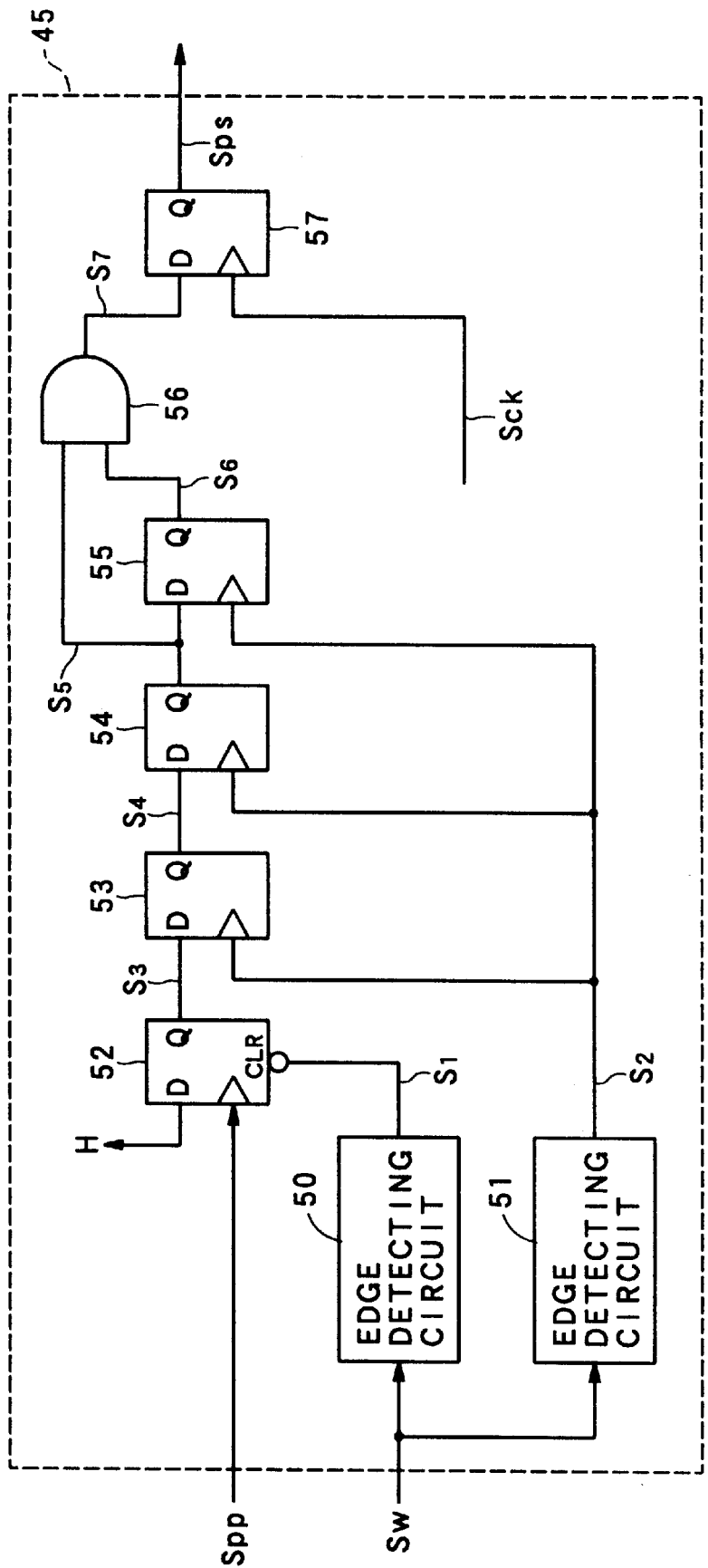
FIG. 6 is a block diagram showing a synchronization detector of the timing controller.

FIG. 6 shows a configuration of the synchronization detector 45 of the timing controller 12. As shown in FIG. 6, the synchronization detector 45 is provided with a first edge detecting circuit 50, a second edge detecting circuit 51, D type flip-flop circuits 52, 53, 54, 55 and 57, and an AND circuit 56.

Figure 7:
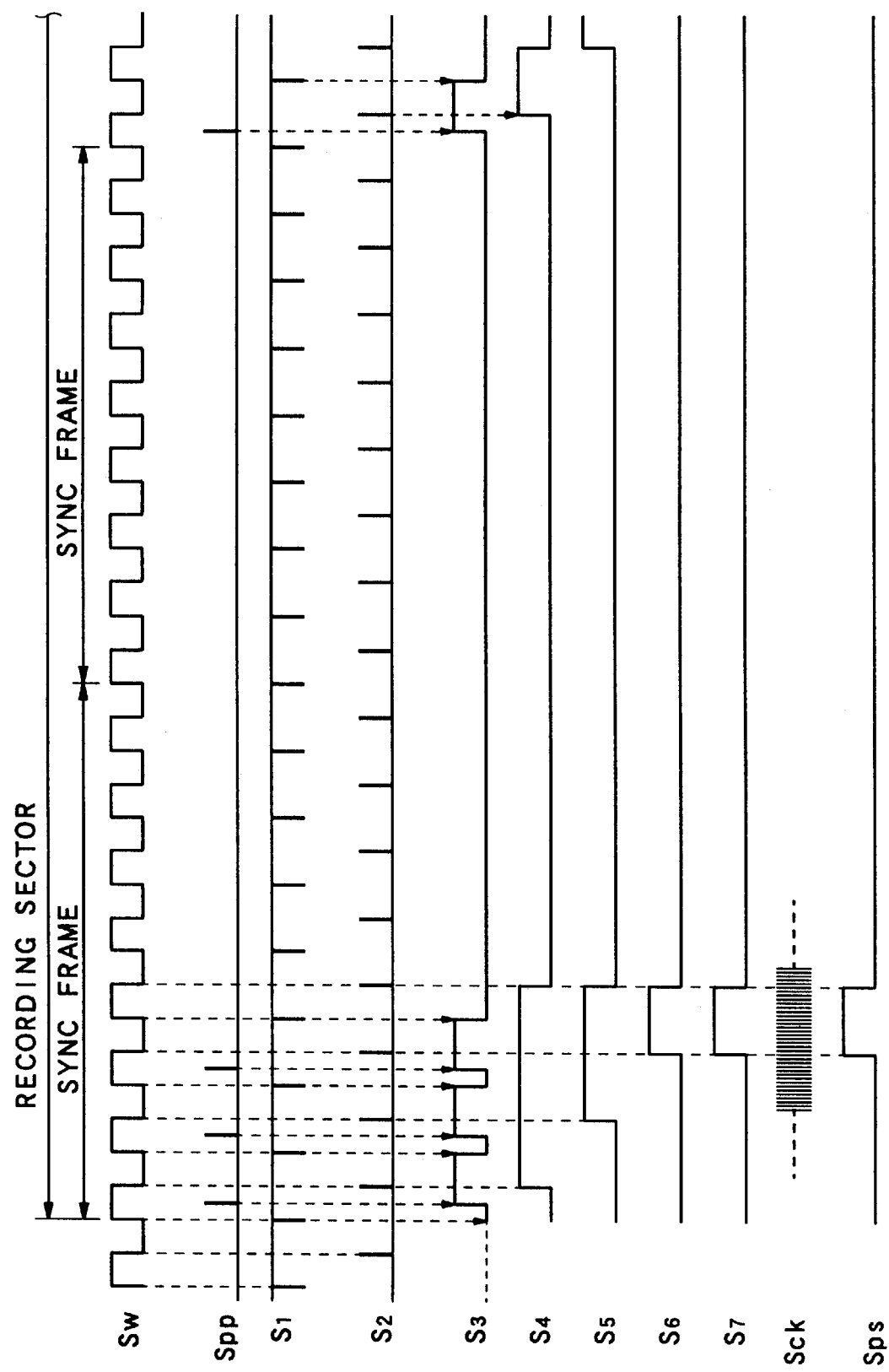
FIG. 7 is a timing chart showing operations of the synchronization detector.

The synchronization detector 45 is operated as follows, in order to generate the detection synchronization signal Sps representing the actual "Sector Record Position". As shown in FIG. 7, the first edge detecting circuit 50 detects a rising time of a wobbling signal Sw, and then outputs a rising signal S1 representing the rising time of the wobbling signal Sw, to a clear terminal of the flip-flop circuit 52. The second edge detecting circuit 51 detects a trailing time of the wobbling signal Sw, and then outputs a trailing signal S2 representing the trailing time of the wobbling signal Sw, to clock terminals of the flip-flop circuits 53 to 55.

The output of the flip-flop circuit 52 becomes HIGH when the pre-pit signal Spp becomes HIGH, and the output becomes LOW when the rising signal S1 becomes LOW. This results in a generation of a timing signal S3 having three continuous pulses as shown in FIG. 7.

The output of the flip-flop circuit 53 becomes HIGH when the trailing signal S2 input to the clock terminal becomes HIGH and further the timing signal S3 becomes HIGH. Also, the output of the flip-flop circuit 53 becomes LOW when the trailing signal S2 becomes HIGH and further the timing signal S3 becomes LOW. This results in a generation of a timing signal S4 as shown in FIG. 7.

The output of the flip-flop circuit 54 becomes HIGH when the trailing signal S2 input to the clock terminal becomes HIGH and further the timing signal S4 becomes HIGH. Also, the output of the flip-flop circuit 54 becomes LOW when the trailing signal S2 becomes HIGH and further the timing signal S4 becomes LOW. This results in a generation of a timing signal S5 as shown in FIG. 7. This timing signal S5 is output to the flip-flop circuit 55 and the AND circuit 56.

The output of the flip-flop circuit 55 becomes HIGH when the trailing signal S2 input to the clock terminal becomes HIGH and further the timing signal S5 becomes HIGH. Also, the output of the flip-flop circuit 55 becomes LOW when the trailing signal S2 becomes HIGH and further the timing signal S5 becomes LOW. This results in a generation of a timing signal S6 as shown in FIG. 7.

Then, the AND circuit 56 calculates the logical product (AND) between the timing signals S5 and S6 to then generate a timing signal S87.

Then, the flip-flop circuit 57 carries out the matching operation between the timing signal S7 and the clock signal Sck to then generate the detection synchronization signal Sps.

V. Synchronization Gate Generator

Figure 8:
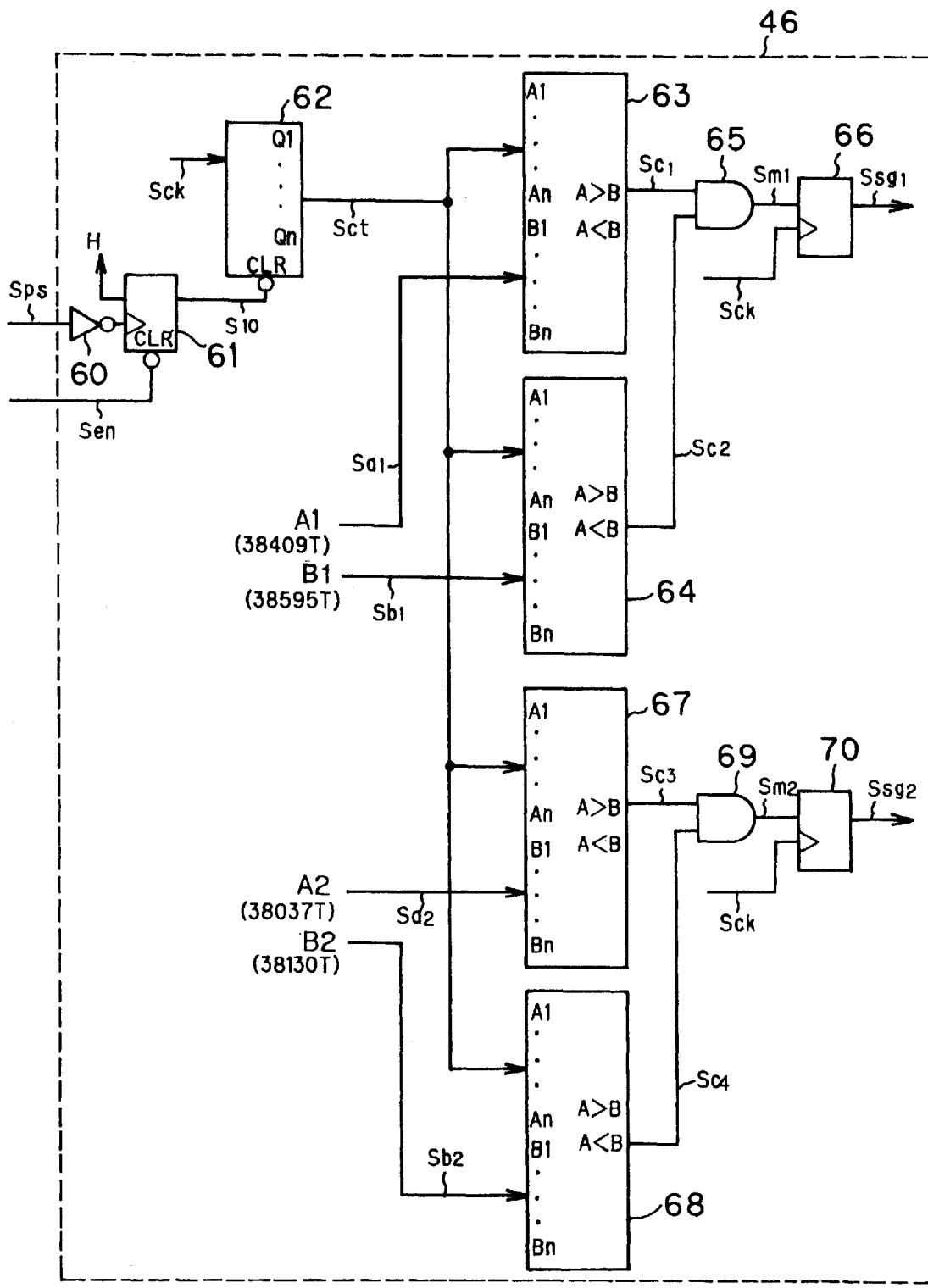
FIG. 8 is a block diagram showing a synchronization gate generator of the timing controller.

FIG. 8 shows a configuration of the synchronization gate generator 46. As shown in FIG. 8, the synchronization gate generator 46 is provided with an inverter 60, D type flip-flop circuits 61, 66 and 70, an n-ary counter 62, comparators 63, 64, 67 and 68, and AND circuits 65, 69.

The n-ary counter 62 is a fly-wheel counter. It resets its count value to zero when the count value becomes 38688T, and then repeats the counting operation from 0 to 38688T. In addition, 38688T implies a length of the single recording sector, and is represented as follows:

$$1488T \times 26 = 38688T \tag{1}$$

In the respective circuits constituting the synchronization gate generator 46, the inverter 60, the flip-flop circuits 61, 66, the n-ary counter 62, the comparators 63, 64 and the AND circuit 65 are the circuits to generate the above-mentioned synchronization gate signal Sag1. On the other hand, the inverter 60, the flip-flop circuits 61, 70, the n-ary counter 62, the comparators 67, 68 and the AND circuit 69 are the circuits to generate the above-mentioned synchronization gate signal Ssg2.

Figure 9:
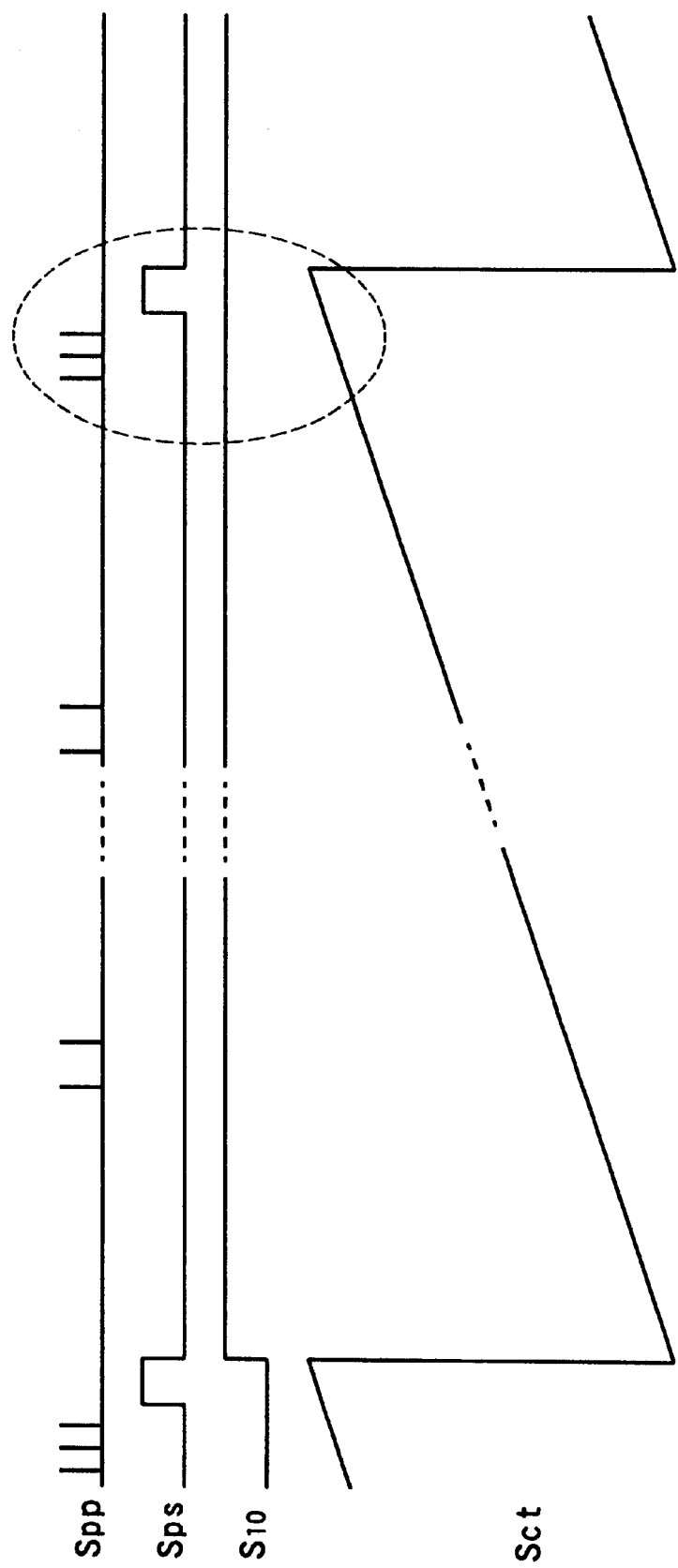
FIG. 9 is a timing chart showing operations of the synchronization gate generator.

The operations of the synchronization gate generator 46 will be described below with reference to FIGS. 9 and 10. In addition, wave forms of respective signals of timings surrounded with a dashed line in a timing chart shown in FIG. 9 is expanded, in a timing chart shown in FIG. 10.

At first, the operations of the circuits to generate the synchronization gate signal Sag1 are described.

The detection synchronization signal Sps inverted by the inverter 60 is input to a clock terminal of the flip-flop circuit 61. On the other hand, an enable signal Sen is input to a clear terminal of the flip-flop circuit 61. This enable signal Sen is a signal representing that the operations of the respective servo control circuits are stable, and it is generated in accordance with the jump signal Sjp. As a result, an output of the flip-flop circuit 61 (S10 in FIG. 9) is changed from the LOW state to the HIGH state when the detection synchronization signal Sps is changed from the HIGH state to the LOW state, after the operations of the respective servo control circuits become stable, as shown in FIG. 9. The output of the flip-flop circuit 61 is output to a clear terminal of the n-ary counter 62 as a timing signal S10.

Then, the n-ary counter 62 to which the clock signal Sck is input starts the counting operation when the timing signal S10 becomes HIGH. Then, the n-ary counter 62 repeats the counting operation from zero and to 38688T, until the timing signal S10 becomes LOW. Then, the n-ary counter 62 outputs its count value as a count signal Sct. In addition, in FIGS. 9 and 10, although the change in the value of the count signal Sct is illustrated as a saw tooth wave form, the count signal Sct is actually a digital signal.

Now, the following points should be noted. As shown in FIG. 10, the time when the timing signal S10 is switched from the LOW state to the HIGH state is the time when the detection synchronization signal Sps is switched from the HIGH state to the LOW state. As mentioned above, the detection synchronization signal Sps is the signal generated in accordance with the wobbling signal Sw and the pre-pit signal Spp representing the position of the pre-pit 4. Thus, the fact that the counting operation of the n-ary counter 62 is started at the time point when the timing signal S10 is switched from the LOW state to the HIGH state implies that the start time of the counting operation of the n-ary counter 62 is made coincident with the actual detection time point of "Sector Record Position". Moreover, the n-ary counter 62 resets the count value to zero when the count value becomes 38688T, and then repeats the counting operation from 0 to 38688T. Then, 38688T is the length of the single recording sector. This implies that the time when the count value is reset to zero always corresponds to the detection time point of "Sector Record Position". That is, a period when a value of the count signal Sct output by the n-ary counter 62 coincides with a period when "Sector Record Position" is to be detected. Thus, even if the failure of the detection of the pre-pit 4 causes "Sector Record Position" to be transiently missed, "Sector Record Position" can be expected in accordance with the count signal Sct.

Figure 10:
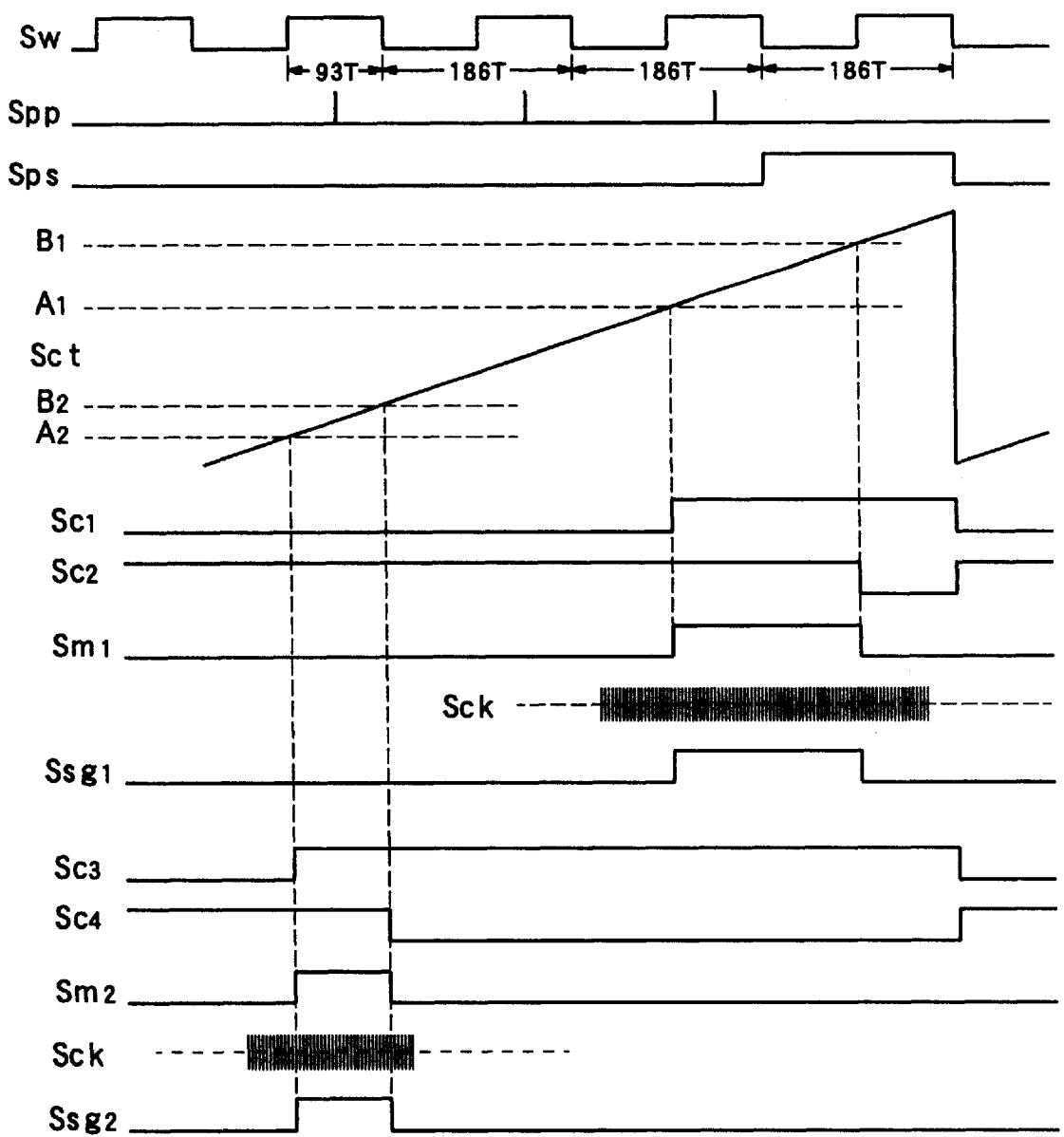
FIG. 10 is a timing chart showing operations of the synchronization gate generator.

Then, the comparator 63 to which the count signal Sct is input compares the value of the count signal Sct with a set value signal Sa1 representing a set value A1 which is set in advance, as shown in FIG. 10. The comparator 63 generates a comparison signal Sc1 which is HIGH until the value of the count signal Sct is returned back to zero after the value of the count signal Sct becomes larger than the set value A1, and then outputs this comparison signal Sc1 to the AND circuit 65.

As shown in FIG. 10, the rising time of the synchronization gate signal Ssg1 is determined in accordance with the set value A1. The set value A1 is set such that the rising time of the synchronization gate signal Sag1 is located prior to the time when the detection synchronization signal Sps is switched from the LOW state to the HIGH state. For example, the set value A1 is 38409T. In addition, the set value A1 is a value in which a value equal to 1.5 times the wobble period is subtracted from the length of the single recording sector, and calculated by the following equation:

$$1488T \times 26 - 186T \times 1.5 = 38409T \quad (2)$$

On the other hand, the comparator 64 to which the count signal Sct is input compares the value of the count signal Sct with a set value signal Sb1 representing a set value B1 which is set in advance. Then, the comparator 64 generates a comparison signal Sc2 which is LOW until the value of the count signal Sct is returned back to zero after the value of the count signal Sct becomes larger than the set value B1, and then outputs this comparison signal Sc2 to the AND circuit 65.

As shown in FIG. 10, the trailing time of the synchronization gate signal Sag1 is determined by the set value B1. The set value B1 is set such that the trailing time of the synchronization gate signal Ssg1 is located after the time when the detection synchronization signal Sps is switched from the HIGH state to the LOW state. For example, the set value B1 is 38595T. In addition, the set value B1 is a value in which a value equal to 0.5 times the wobble period is subtracted from the length of the single recording sector, and calculated by the following equation:

$$1488T \times 26 - 186T \times 0.5 = 38595T \quad (3)$$

Then, the AND circuit 65 to which the comparison signals Sc1, Sc2 are input calculates a logical product (AND) between both the signals, and then generates a product signal Sm1, and further outputs it to the flip-flop circuit 66.

Then, the flip-flop circuit 66 carries out the matching between the product signal Sm1 and the clock signal Sck to generate the synchronization gate signal Ssg1.

In this way, the synchronization gate signal Sag1 is a signal for representing a practically pseudo "Sector Record Position", which is generated in accordance with the count signal Sct.

In addition, after the synchronization gate signal Sag1 is once generated by using the above-mentioned manner, an output of this synchronization gate signal Sag1 may be continued by using a free-run counter.

The operations of the circuits to generate the synchronization gate signal Ssg2 will be described below.

The count signal Sct generated by the inverter 60, the flip-flop circuit 61 and the n-ary counter 62 is also used when the synchronization gate signal Ssg2 is generated.

As shown in FIG. 10, the comparator 67 to which the count signal Sct is input compares the value of the count signal Sct with a set value signal Sa2 representing a set value A2 which is set in advance The comparator 67 generates a comparison signal Sc3 which is HIGH until the value of the count signal Sct is returned back to zero after the value of the count signal Sct becomes larger than the set value A2, and then outputs this comparison signal Sc3 to the AND circuit 69.

As shown in FIG. 10, the rising time of the synchronization gate signal Ssg2 is determined in accordance with the set value A2. The rising time of the synchronization gate signal Ssg2 coincides with a timing when a pulse of a wobbling signal Sw corresponding to a timing of a lead pulse in three continuous pre-pit signals Spp is switched to the HIGH state. For example, the set value A2 is 38037T. In addition, the set value A2 is a value in which a value equal to 3.5 times the wobble period is subtracted from the length of the single recording sector, and calculated by the following equation:

$$1488T \times 26 - 186T \times 3 - 93T = 38037T \quad (4)$$

On the other hand, the comparator 68 to which the count signal Sct is input compares the value of the count signal Sct with a set value signal Sb2 representing a set value B2 which is set in advance. Then, the comparator 68 generates a comparison signal Sc4 which is LOW until the value of the count signal Sct is returned back to 0 after the value of the count signal Sct becomes larger than the set value B2, and then outputs this comparison signal Sc4 to the AND circuit 69.

As shown in FIG. 10, the trailing time of the synchronization gate signal Ssg2 is in accordance with the set value B2. The trailing time of the synchronization gate signal Ssg2 coincides with the timing when the pulse of the wobbling signal Sw corresponding to the timing of the lead pulse in the three continuous pre-pit signals Spp is switched to the LOW state. For example, the set value B2 is 38130T. In addition, the set value B2 is a value in which a value equal to 3 times the wobble period is subtracted from the length of the single recording sector, and calculated by the following equation:

1488T×26−186T×3=38130T (5)

Then, the AND circuit 69 to which the comparison signals Sc3, Sc4 are input calculates the logical product (AND) between both the signals, and then generates a product signal Sm2, and further outputs it to the flip-flop circuit 70.

Then, the flip-flop circuit 70 carries out the matching between the product signal Sm2 and the clock signal Sck to generate the synchronization gate signal Ssg2.

In this way, similarly to the synchronization gate signal Sag1, the synchronization gate signal Ssg2 is also a signal for representing the practically pseudo "Sector Record Position", which is generated in accordance with the count signal Sct. The synchronization gate signal Ssg2 serves as a signal for expecting a time point that the pre-pits 4 is to be detected.

In addition, after the synchronization gate signal Ssg2 is once generated by using the above-mentioned manner, an output of this synchronization gate signal Ssg2 may be continued by using the free-run counter.

VI. Recording Condition Detector

Figure 11:
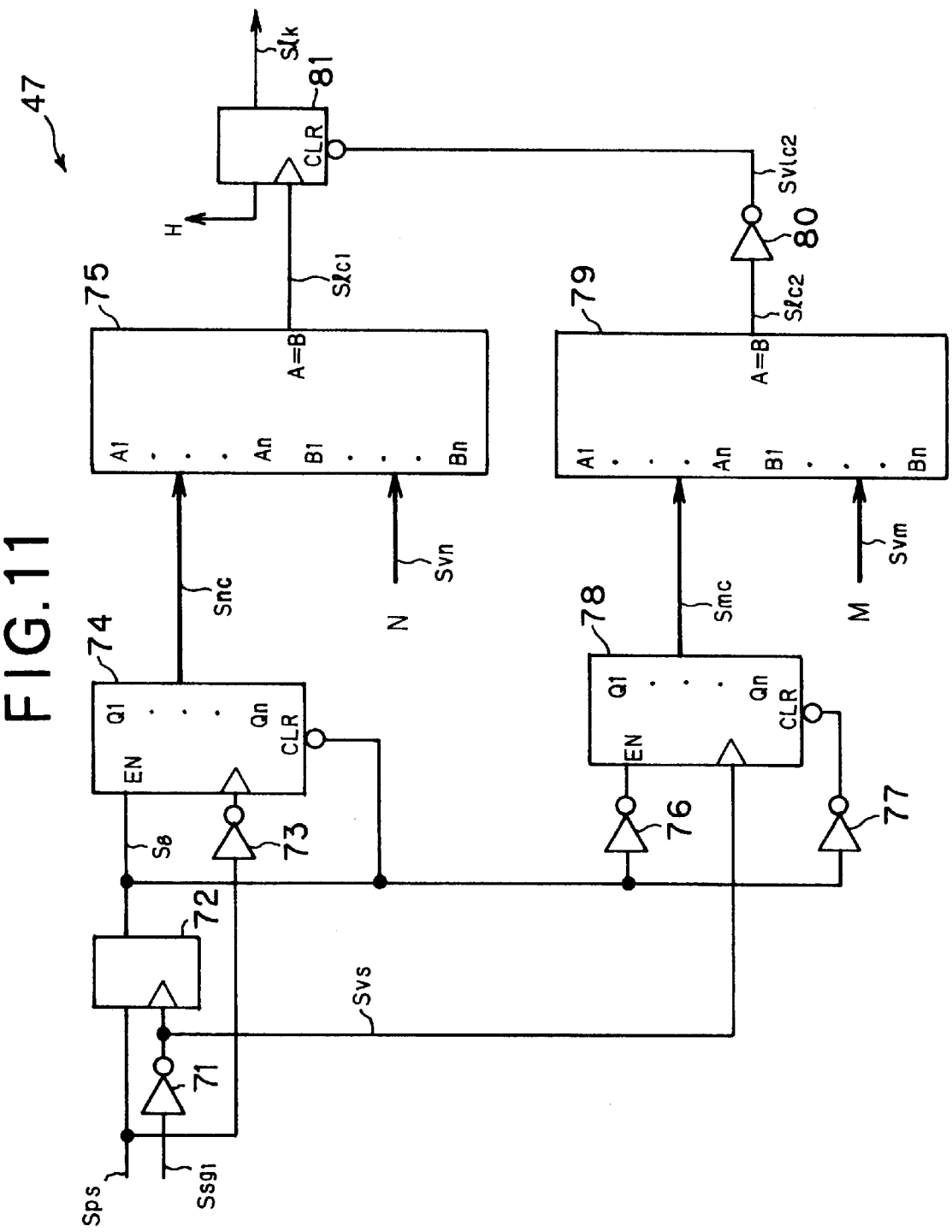
FIG. 11 is a block diagram showing a recording condition detector of the timing controller.

FIG. 11 shows a configuration of the recording condition detector 47. As shown in FIG. 11, the recording condition detector 47 is provided with inverters 71, 73, 76, 77 and 80, D type flip-flop circuits 72, 81, n-ary counters 74, 78 and comparators 75, 79.

Among the above-mentioned elements, the inverters 71, 73, the flip-flop circuit 72, the n-ary counter 74 and the comparator 75 are the circuits to detect the "Establishment State". On the other hand, the inverters 71, 76, 77 and 80, the flip-flop circuit 72, the n-ary counter 78 and the comparator 79 are the circuits to detect "Non-Establishment State" because of the track jump.

Figure 12A:
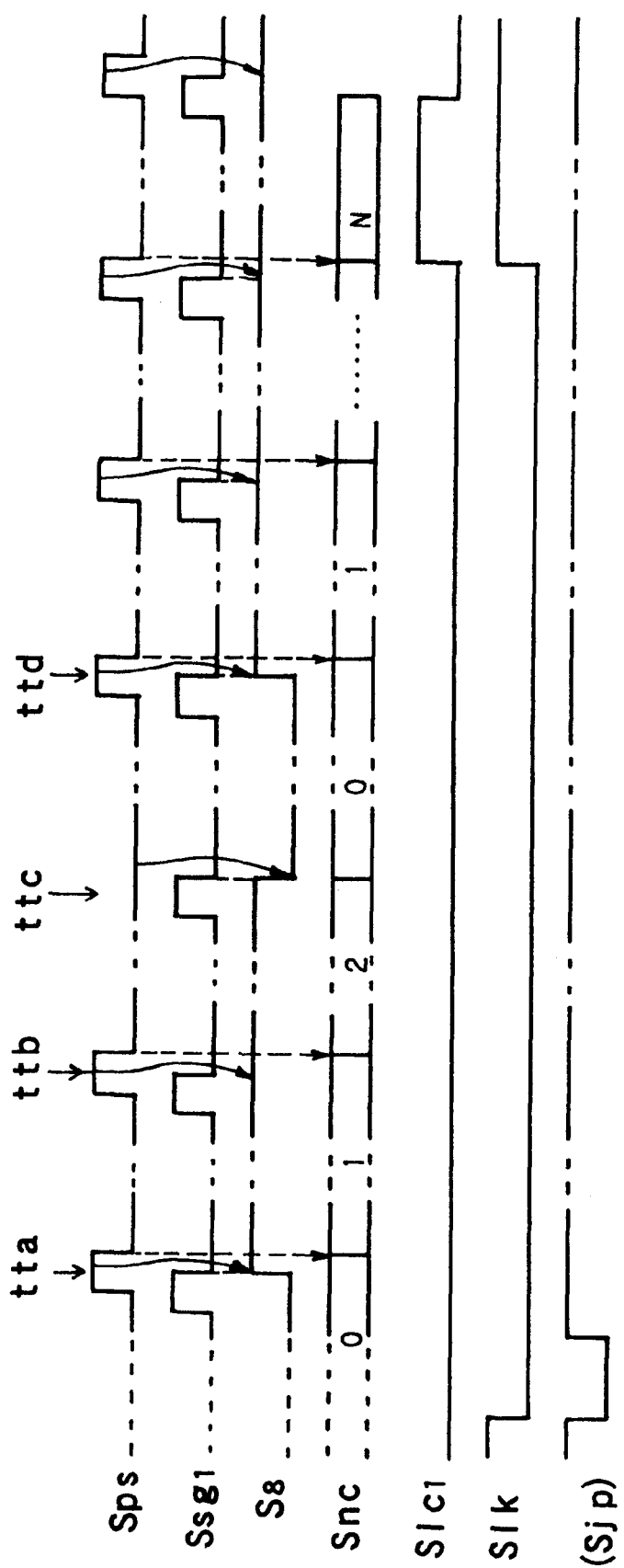
FIG. 12A is a timing chart showing operations of the recording condition detector.

An operations of the recording condition detector 47 will be described below with reference to FIGs.12A and 12B. At first, an operations of the circuits to detect "Establishment State" is described with reference to FIG. 12A.

The detection synchronization signal Sps is input to an input terminal of the flip-flop circuit 72. The synchronization gate signal Ssg1 is input through the inverter 71 to a clock terminal of the flip-flop circuit 72. Thus, the synchronization gate signal Sag1 is inverted by the inverter 71.

In general, the output of the D type flip-flop circuit becomes HIGH, if the signal input to the input terminal is HIGH, when the signal input to the clock terminal becomes HIGH. On the other hand, the output of the D type flip-flop circuit becomes LOW, if the signal input to the input terminal is LOW, when the signal input to the clock terminal becomes HIGH.

Thus, the detection synchronization signal Sps is always HIGH, when the synchronization gate signal Sag1 is switched from the HIGH state to the LOW state (when the input signal to the clock terminal is switched from the LOW state to the HIGH state), if the pre-pit 4 is normally detected and further the detection synchronization signal Sps is normally generated (at times tta and ttb in FIG. 12). Hence, in this case, the output of the flip-flop circuit 72 is always HIGH.

On the contrary, the detection synchronization signal Sps is LOW, for example, if the crack or the contaminant on the DVD-R 1 causes the pre-pit 4 to be not normally detected and thereby the detection synchronization signal Sps is not normally generated (at time ttc in FIG. 12). As a result, the output of the flip-flop circuit 72 is changed to the LOW sate, when the synchronization gate signal Sag1 is switched from the HIGH state to the LOW state.

Then, the output of the flip-flop circuit 72 becomes again HIGH, when the detection of the detection synchronization signal Sps is normally resumed (time ttd in FIG. 12).

Then, the output of the flip-flop circuit 72 is output to a clear terminal and an enable terminal of the n-ary counter 74 as an output signal S8. A signal in which the detection synchronization signal Sps is inverted by the inverter 73 is input to the clock terminal of the n-ary counter 74.

The n-ary counter 74 starts the operation of counting the pulses of the detection synchronization signal Sps input to the clock terminal, when the output signal S8 input to the enable terminal is switched from the LOW state to the HIGH state. Then, the n-ary counter 74 initializes the count value when the signal input to the clear terminal is switched from the HIGH state to the LOW state. Moreover, the n-ary counter 74 outputs a count value signal Snc representing the count value.

Thus, the count value of the count value signal Snc becomes zero if the detection synchronization signal Sps is not normally detected and thereby the output signal S8 is LOW. On the other hand, when the generation of the detection synchronization signal Sps causes the output signal S8 to be switched to the HIGH state (time tta), the count value is increased by 1, each time the pulse of the detection synchronization signal Sps is trailed. Moreover, the count value becomes 0 if the detection synchronization signal Sps is not generated and thereby the output signal S8 is switched to the LOW state (time ttc).

Then, the comparator 75 to which the count value signal Snc is input compares the value of the count value signal Snc with a set value signal Svn corresponding to a set value N which is set in advance. Then, the output of the comparator 75 becomes HIGH if the value of the count value signal Snc is equal to the set value N. The output of the comparator 75 is output to a clock terminal of the flip-flop circuit 81 as a comparison signal Slc1.

It can be determined that "Establishment State" is established if the pulses of the detection synchronization signal Sps continuously appears. The set value N is, for example, 2. This implies that "Establishment State" is determined to be established if the pulses of the detection synchronization signal Sps continuously appears two times.

Then, the flip-flop circuit 81 switches the state signal Slk to the HIGH state, if the comparison signal Slc1 is input. After that, the state signal Slk is kept HIGH until an inversion comparison signal Svic2 described later is input to the clear terminal of the flip-flop circuit 81.

The operations of the circuit to detect that "Non-Establishment State" is established in the recording condition detector 47 will be described below with reference to FIG. 12B.

The output signal S8 generated by the inverter 71 and the flip-flop circuit 72 is inverted by the inverters 76, 77, and input to the clear terminal and the enable terminal of the n-ary counter 78, respectively. Moreover, a signal in which the synchronization gate signal Sag1 is inverted by the inverter 71 is input to the clock terminal of the n-ary counter 78.

The n-ary counter 78 is operated similarly to the n-ary counter 74, and outputs a count value signal Smc representing the count value. Thus, as shown in FIGS. 12A and 12B, if the detection synchronization signal Sps is normally detected and thereby the output signal S8 is HIGH, the counting operation in the n-ary counter 78 is not started, and the count value is zero. On the other hand, if the detection synchronization signal Sps is not generated and thereby the output signal S8 is switched from the HIGH state to the LOW state (time tte in FIG. 12B), the n-ary counter 78 starts the operation of counting the pulses of the synchronization gate signal Sag1. Then, the n-ary counter 78 initializes the count value if the detection synchronization signal Sps is generated and thereby the output signal S8 is switched to the HIGH state.

Then, the comparator 79 compares a value of the count value signal Smc with a set value signal Svm corresponding to a set value M which is set in advance. The output of the comparator 79 becomes HIGH if the count value signal Smc is equal to the set value M. The output of the comparator 79 is output to the inverter 80 as a comparison signal Slc2. Then, the comparison signal Slc2 is inverted by the inverter 80, and output to the clear terminal of the flip-flop circuit 81 as an inversion comparison signal Svic2.

It can be determined that "Non-Establishment State" is established if the pulses of the detection synchronization signal Sps do not appear continuously. The set value M is, for example, 5 or 6. This implies that "Non-Establishment State" is determined to be established if the pulses of the detection synchronization signal Sps do not appear continuously five or six times.

Then, the state signal Slk output by the flip-flop circuit 81 becomes LOW when the comparison signal Slc2 is switched from the LOW state to the HIGH state.

Such a recording condition detector 47 generates the state signal Slk which becomes HIGH when "Establishment State" is established and which becomes LOW when "Non-Establishment State" is established, and then outputs it to the reset signal generator 48.

In sum, the detection synchronization signal Sps is the signal representing the actually detected "Sector Record Position". Thus, the loss of the pulse is brought about by the failure of the detection of the pre-pit 4 because of the crack or the contaminant on the DVD-R 1. On the contrary, the synchronization gate signals Sag1 are the signal generated in accordance with the count value of the n-ary counter 62 in the synchronization gate generator 46. Hence, the loss of the pulse is not brought about even if the crack or the contaminant on the DVD-R 1 causes the failure of the detection of the pre-pit 4. Therefore, it can be determined whether the present information recorder 100 is in "Establishment State" or "Non-Establishment State", in accordance with the comparison between the detection synchronization signal Sps and the synchronization gate signal Sag1.

VII. Generation of Reset Signal

Figure 13:
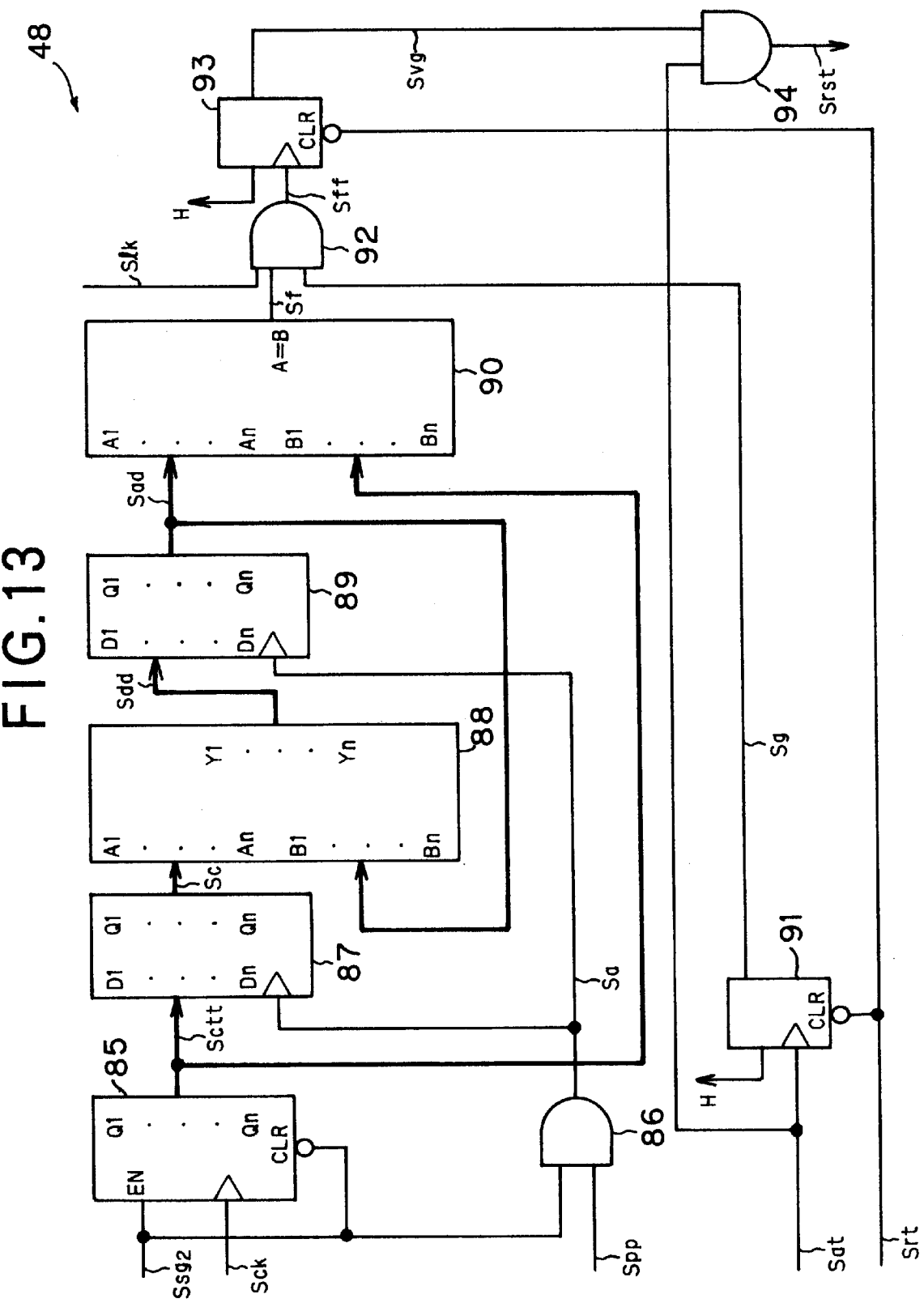
FIG. 13 is a block diagram showing a reset signal generator of the timing controller.

FIG. 13 shows a configuration of the reset signal generator 48. As shown in FIG. 13, the reset signal generator 48 is provided with an n-ary counter 85, AND circuits 86, 94, D type flip-flop circuits 87, 89, 91 and 93, an average calculator 88, a comparator 90 and an AND circuit 92.

The reset signal generator 48 is operated as follows (FIG. 14). In addition, a pre-pit signal Spp in FIG. 14 shows only a pulse representing a lead of the recording sector (a section in which three pulses appear closely to each other). Among these pulses, a pulse indicated by a dashed line implies that the pre-pit 4 which should be detected at that timing is not detected because of the crack or the contaminant on the DVD-R 1.

The pre-pit signal Spp and the synchronization gate signal Ssg2 are input to the AND circuit 86. Then, the output of the AND circuit 86 becomes HIGH, only if both the signals are HIGH.

The pre-pit signal Spp represents the actually detected pre-pit 4, and the pre-pit 4 is always located at a position corresponding to "Sector Record Position" on the DVD-R 1, as described above. Since the pre-pit signal Spp is generated based on a result of an actual detection of the pre-pit 4 by the pickup 10, this signal becomes LOW when the pickup 10 fails to detect the pre-pit 4 because of crack, contaminant or the like on the DVD-R 1. On the other hand, the synchronization gate signal Ssg2 represents the practically pseudo "Sector Record Position" of the DVD-R 1. Therefore, the synchronization gate signal Ssg2, as shown in FIG. 14, always becomes HIGH at the time that the pre-pit 4 is to be detected, even if the pickup 10 fails to detect the pre-pit 4. Accordingly, the output of the AND circuit 86 becomes HIGH when the pre-pit 4 is normally detected, but it becomes LOW when the pre-pit 4 is not normally detected. The output of the AND circuit 86 is applied to the clock terminals of the flip-flop circuits 87 and 88 as a product signal Sa. Thus, the product signal Sa indicates whether or not the pre-pit 4 is normally detected, and indicates the actual time point that the pre-pit 4 is normally detected. When the pre-pit 4 is not normally detected, the product signal Sa of LOW is applied to the clock terminals of the flip-flop circuits 87 and 88, and as a result, output signals Sc and Sad of the flip-flop circuits 87 and 89 are maintained.

On the other hand, the synchronization gate signal Ssg2 is input to a clear terminal and an enable terminal of the n-ary counter 85. Also, the clock signal Sck is input to a clock terminal of the n-ary counter 85. Then, the n-ary counter 85 starts the operation of counting the pulses of the clock signal Sck when the synchronization gate signal Ssg2 is switched from the LOW state to the HIGH state. The n-ary counter 85 outputs a count value signal Sctt representing the count value thereof. The n-ary counter 85 stops the counting operation when the synchronization gate signal Ssg2 is switched from the HIGH state to the LOW state, and then initializes the count value to zero. The n-ary counter 85 repeats such a counting operation each time the pulse of the synchronization gate signal Ssg2 is input. The count value signal Sctt is supplied to the input terminal of the flip-flop circuit 87.

The flip-flop circuit 87 receives the count value signal Sctt, and outputs the count value of the received count value signal Sctt only when the product signal Sa becomes HIGH. Then, the flip-flop circuit 87 maintains this output count value while the product signal Sa is LOW. This means that the count value output from the flip-flop 87 represents the time point actually and normally detected pre-pit 4. For example, in FIG. 14, the value of the output signal Sc is maintained in a period from time ta to time td (During this period the pre-pit 4 is not normally detected.).

On the other hand, the output signal Sc and an output signal Sad of the flip-flop circuit 89 are input to the average calculator 88. The average calculator 88 calculates an average of the output signal Sc and the output signal Sad, and then outputs an average signal Sdd.

The flip-flop circuit 89 receives the value of the average signal Sdd, and outputs the received value only when the product signal Sa becomes HIGH. This value is applied to the average calculator 88 and the comparator 90 as the output signal Sad. On the other hand, the flip-flop circuit 89 maintains this output value while the product signal Sa is LOW. This means that the value of the previous output signal Sad is maintained while the detection of the pre-pit 4 is not normally done (times ta to tc in FIG. 14). Accordingly, the combination of the average calculator 88 and the flip-flop 89 calculates the average of the time point that the pre-pit 4 is detected now and the time point that the pre-pit 4 is detected previously or in the past. Therefore, the average signal Sdd represent the accurate time point that the pre-pit 4 is detected.

Then, the output signal Sad and the count value signal Sctt are input to the comparator 90. The comparator 90 compares the value of the output signal Sad with the value of the count value signal Sctt, and then generates a comparison signal Sf which becomes HIGH at a timing when both the values become equal to each other. Therefore, the value represented by the average signal Sdd is converted into the comparison signal Sf having a pulse representing the exact time point that the pre-pit 4 is detected, as shown in FIG. 14. Then, the comparison signal Sf is fed into the AND circuit 92.

As seen from FIG. 14, the pulse of the comparison signal Sf always rise at the time point that the pre-pit 4 is to be detected (ta, tb, tc and td) by the operations of the flip-flop circuits 87, 89 and the average calculator 88, even if the pre-pit is not actually detected (ta, tb and tc).

Then, the address signal Sat and the instruction signal Srt are input to the flip-flop circuit 91 at a timing shown in FIG. 14. The address signal Sat represents a record position (address on the DVD-R 1) of the recording sector immediately before the recording sector that is about to be recorded now. In addition, a symbol "F" in FIG. 14 denotes the address represented by the address signal Sat. The instruction signal Srt is a signal indicating the start of the operation of recording the record data Sr, and is output by the CPU 14. Then, an output of the flip-flop circuit 91 is switched to the HIGH state when the address signal Sat becomes HIGH, and is hereafter kept HIGH. The output of the flip-flop circuit 91 is sent to the AND circuit 92 as an output signal Sg. At this time, the output signal Sg indicates that the light spot SP of the light beam B is positioned at the place corresponding to the recording sector immediately before the recording sector that is about to be recorded now.

The AND circuit 92 outputs a timing signal Sff, if all the output signals Sad, Sg and the state signal Slk are HIGH. That is, the timing signal Sff becomes HIGH, (i) if the detection synchronization signal Sps is normally generated (that is, the pre-pit 4 is normally detected) and "Establishment State" is established, and (ii) if the light spot SP is positioned at the place corresponding to the recording sector immediately before the recording sector that is about to be recorded now, and (iii) if the pulse of the timing signal Sff rises.

Then, the flip-flop circuit 93 receives the timing signal Sff, and directly supplies it to the AND circuit 44 if the instruction signal Srt is HIGH. Therefore, the timing signal Sff is supplied to the AND circuit 44 as the timing signal Svg.

Then, an output of the AND circuit 94 becomes HIGH if both the timing signal Svg and the address signal Sat are HIGH. The output of the AND circuit 94 is output to the counter 49 as the reset signal Srst.

At this stage, the time point that the reset signal Srst is switched from the LOW state to the HIGH state (time tb in FIG. 14) indicates the exact time point that the pre-pit 4 is to be detected. Next, the recording time point at which the recording sector is actually recorded on the DVD-R 1 will be determined by the counter 49.

The counter 49 starts the operation of counting the clock signal Sck when the reset signal Srst is switched from the LOW state to the HIGH state. When the count value reaches a predetermined set value, the counter 49 outputs the record start signal Stt to the DVD encoder 15 so that the operation of actually recording the record data Sr is started. That is, the time point that the recording start signal Sstt is output from the counter 49 to the DVD encoder 15 is set as the recording time point.

For example, the set value of the counter 49 is zero, when the record data Sr is recorded on the DVD-R 1 on which information is not recorded at all. In this case, the record data Sr is recorded on the DVD-R 1 substantially at the same time as the time point that the pre-pit 4 is to be detected. Also, the set value of the counter 49 is 2976T (1448T×2), if the record data Sr is additionally recorded on the DVD-R 1 on which information is already recorded. This is because It is necessary to accurately adjust the recording position of the record data Sr when the record data Sr is recorded next to the information which was already recorded on the DVD-R 1. In this case, it is preferable that the set value is set at the value correspondence with the length equal to two times the length of the synchronization frame.

As described above, according to the information recorder 100 of the present invention, the recording time point is expected on the basis of the pre-pit 4 detected previously or in the past, even if the information recorder 100 fails to detect a pre-pit 4 now or in future. Therefore, even if the crack or the contaminant on the DVD-R 1 causes the failure of the detection of the pre-pit 4, the exact recording time point can be set for each recording sector.

Also, the number of pulses in the clock signal Sck is counted by using the already-detected detection synchronization signal Sps. Then, the average of the respective count values is used to expect the recording time point to thereby generate the reset signal Srst. Hence, the recording time point can be expected and set further exactly.

Moreover, it is possible to expect the recording time point to thereby generate the recording start signal Sstt, even if the record data Sr is recorded on the DVD-R 1 following the already-recorded information. Hence, the recording time point can be exactly set even if the record data Sr is additionally recorded.

Furthermore, the operation of counting the number of pulses of the clock signal Sck is started from the time point indicated by the reset signal Srst, and the operation of recording it is started from the time when the counted pulse number becomes equal to a predetermined pulse number set correspondingly to the record data Sr information to be recorded. Hence, the record position can be exactly specified and recorded.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the clams are therefore intended to be embraced therein.

The entire disclosure of Japanese Patent Application No. 10-72793 filed on Mar. 20, 1998 including the specification, claims, drawings and summary is incorporated herein by reference in its entirety.

What is claimed is:

1. A method of setting a recording time point for recording an information piece into one of a plurality of predetermined areas on a recording medium on the basis of plurality of marks, the marks being pre-recorded on the recording medium at predetermined intervals, locations of the marks corresponding to locations of the predetermined areas, respectively, the locations of the predetermined areas being predetermined on the basis of a time length of the information piece, the method comprising the process of:

detecting at least one of the marks;

generating a expectation signal on the basis of the time length of the information piece and synchronizing a time point at which an output of the expectation signal is started with a time point at which the at least one of the marks is detected in the detecting process, the expectation signal being a signal for determining an expectation time point that one of the marks, except for the at least one of the marks already detected in the detecting process, is to be detected; and setting the expectation time point determined by the expectation signal as the recording time point, wherein the generating process comprises a process of calculating an average of the expectation time point determined by the expectation signal that is generated at a present time and the expectation time point determined by the expectation signal that is generated in the past.

2. A method of setting a recording time point for recording an information piece into one of a plurality of predetermined areas on a recording medium on the basis of a plurality of marks, the marks being pre-recorded on the recording medium at predetermined intervals, locations of the marks corresponding to locations of the predetermined areas, respectively, the locations of the predetermined areas being predetermined on the basis of a time length of the information piece, the method comprising the processes of:

detecting at least one of the marks;

generating a expectation signal on the basis of the time length of the information piece and synchronizing a time point at which an output of the expectation signal is started with a time point at which the at least one of the marks is detected in the detecting process, the expectation signal being a signal for determining an expectation time point that one of the marks, except for the at least one of the marks already detected in the detecting process, is to be detected; and setting the expectation time point determined by the expectation signal as the recording time point, wherein the generating process comprises a process of adjusting the expectation time point depending on whether no information piece is recorded on the recording medium or whether another information piece has been already recorded on the recording medium.

3. The method according to claim 1, wherein the recording medium is a DVD of a recordable type, the information piece is a recording sector, and each of the marks is a pre-pit.

4. The method according to claim 2, wherein the recording medium is a DVD of a recordable type, the information piece is a recording sector, and each of the marks is a pre-pit.

5. The method according to claim 1, wherein the expectation signal having a period corresponding to the time length of the information piece is generated in the generating process.

6. The method according to claim 2, wherein the expectation signal having a period corresponding to the time length of the information piece is generated in the generating process.

7. The method according to claim 1, wherein the expectation signal is a pulse signal including a pulse which determines the expectation time point.

8. The method according to claim 2 wherein the expectation signal is a pulse signal including a pulse which determines the expectation time point.

9. An apparatus for setting a recording time point for recording an information piece into one of a plurality of predetermined areas on a recording medium on the basis of a plurality of marks, the marks being pre-recorded on the recording medium at predetermined intervals, locations of the marks corresponding to locations of the predetermined areas, respectively, the locations of the predetermined areas being predetermined on the basis of a time length of the information piece, the apparatus comprising:

a detecting device for detecting at least one of the marks;

a generating device for generating an expectation signal on the basis of the time length of the information piece and for synchronizing a time point at which an output of the expectation signal is started with a time point at which the at least one of the marks is detected by the detecting device, the expectation signal being a signal for determining an expectation time point that one of the marks, except for the at least one of the marks already detected by the detecting device, is to be detected; and a setting device for setting the expectation time point determined by the expectation signal as the recording time point, wherein the generating device comprises a calculation device for calculating an average of the expectation time point determined by the expectation signal that is generated at a present time and the expectation time point determined by the expectation signal that is generated in the past.

10. An apparatus for setting a recording time point for recording an information piece into one of a plurality of predetermined areas on a recording medium on the basis of a plurality of marks, the marks being pre-recorded on the recording medium at predetermined intervals, locations of the marks corresponding to locations of the predetermined areas, respectively, the locations of the predetermined areas being predetermined on the basis of a time length of the information piece, the apparatus comprising:

a detecting device for detecting at least one of the marks;

a generating device for generating an expectation signal on the basis of the time length of the information piece and for synchronizing a time point at which an output of the expectation signal is started with a time point at which the at least one of the marks is detected by the detecting device, the expectation signal being a signal for determining an expectation time point that one of the marks, except for the at least one of the marks already detected by the detecting device, is to be detected; and a setting device for setting the expectation time point determined by the expectation signal as the recording time point, wherein the generating device comprises a adjusting device for adjusting the expectation time point depending on whether no information piece is recorded on the recording medium or whether another information piece has been already recorded on the recording medium.

11. The apparatus according to claim 9, wherein the recording medium is a DVD of a recordable type, the information piece is a recording sector, and each of the marks is a pre-pit.

12. The apparatus according to claim 10, wherein the recording medium is a DVD of a recordable type, the information piece is a recording sector, and each of the marks is a pre-pit.

13. The apparatus according to claim 9, wherein the generating device generates the expectation signal having a period corresponding to the time length of the information piece.

14. The apparatus according to claim 10, wherein the generating device generates the expectation signal having a period corresponding to the time length of the information piece.

15. The apparatus according to claim 9, wherein the expectation signal is a pulse signal including a pulse which determines the expectation time point.

16. The apparatus according to claim 10, wherein the expectation signal is a pulse signal including a pulse which determines the expectation time point.

* * * * *